United States Patent
Nakajima et al.

(10) Patent No.: US 7,913,037 B2
(45) Date of Patent: Mar. 22, 2011

(54) COMPUTER SYSTEM FOR CONTROLLING ALLOCATION OF PHYSICAL LINKS AND METHOD THEREOF

(75) Inventors: Akio Nakajima, Yokohama (JP); Ikuya Yagisawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 480 days.

(21) Appl. No.: 11/414,675

(22) Filed: Apr. 27, 2006

(65) Prior Publication Data
US 2007/0220204 A1    Sep. 20, 2007

(30) Foreign Application Priority Data

Mar. 20, 2006 (JP) .................. 2006-076505

(51) Int. Cl.
*G06F 12/00* (2006.01)
*G06F 12/08* (2006.01)

(52) U.S. Cl. ........ 711/114; 709/226; 709/223; 709/229; 709/239; 709/240; 710/31; 710/28; 710/45; 710/100; 710/38; 710/123; 710/116; 711/141; 711/163; 711/100

(58) Field of Classification Search .................. 711/114, 711/141, 163, 100; 709/226, 223, 229, 239, 709/240; 710/31, 28, 45, 100, 38, 123, 116
See application file for complete search history.

(56) References Cited

U.S. PATENT DOCUMENTS

| 6,425,049 | B1 | 7/2002 | Yamamoto et al. | |
|---|---|---|---|---|
| 7,130,909 | B2* | 10/2006 | Yamashita et al. | 709/223 |
| 7,251,704 | B2* | 7/2007 | Solomon et al. | 710/316 |
| 7,376,726 | B2* | 5/2008 | Yamashita et al. | 709/223 |
| 2004/0162940 | A1 | 8/2004 | Yagisawa et al. | |
| 2005/0117462 | A1 | 6/2005 | Kano et al. | |
| 2005/0132103 | A1 | 6/2005 | Yagisawa et al. | |
| 2008/0209135 | A1* | 8/2008 | Clark et al. | 711/146 |

FOREIGN PATENT DOCUMENTS

| JP | 2002-215335 | 8/2002 |
|---|---|---|
| JP | 2005-149173 | 6/2005 |

* cited by examiner

*Primary Examiner* — Sanjiv Shah
*Assistant Examiner* — Midys Rojas
(74) *Attorney, Agent, or Firm* — Sughrue Mion, PLLC

(57) ABSTRACT

The computer system of the present invention has a plurality of SAS target devices, an SAS initiator device, and a service delivery subsystem that is connected to each SAS target device by means of a physical link that is physical wiring and connected to the SAS initiator device by means of a wide link constituted by a plurality of physical links. The SAS initiator device controls how many physical links in the wide link are allocated to a particular SAS target device, whereby access from the SAS initiator device to the SAS target device is made via a physical link that is allocated to the SAS target device and is not made via a physical link that is not allocated to the SAS target device.

20 Claims, 16 Drawing Sheets

FIG. 6

EXPANDER ROUTE TABLE 196a

| | | PHY IDENTIFIER OF SAS EXPANDER 130a | | | | |
|---|---|---|---|---|---|---|
| | | 0 | 1 | 2 | 3 | ... |
| | | WIDE LINK 120a | | | | |
| ROUTE INDEX | 0 | SAS ADDRESS OF DRIVE 114b | SAS ADDRESS OF DRIVE 114b | SAS ADDRESS OF DRIVE 114a | UNREGISTERED | |
| | 1 | SAS ADDRESS OF DRIVE 114c | SAS ADDRESS OF DRIVE 114c | SAS ADDRESS OF DRIVE 114a | | |
| | ... | UNREGISTERED | | | | |

EXPANDER ROUTE TABLE 196b

| | | PHY IDENTIFIER OF SAS EXPANDER 130b | | | | |
|---|---|---|---|---|---|---|
| | | 0 | 1 | 2 | 3 | ... |
| | | WIDE LINK 120b | | | - | |
| ROUTE INDEX | 0 | ALL UNREGISTERED | | | | |
| | ... | | | | UNREGISTERED | |

| 710 | 720 | 730 | 740 | 750 | 760 | 770 | 780 | 790 |
|---|---|---|---|---|---|---|---|---|
| RG NUMBER | DRIVE CLASSIFICATION | LU NUMBER | ZONE NUMBER | STATISTICAL INFORMATION ON PERFORMANCE | PERFORMANCE THRESHOLD VALUE | PHY IDENTIFIER CONSTITUTING WL | PRODUCTION OF WIDE LINK PART FAULT | OVERWRAPPED ZONE |
| RG#1 | HIGH PERFORMANCE SAS | LU#1 LU#3 | ZONE#1 | ... TIME10:700MB/s TIME11:700MB/s | 600MB/s OVER THRESHOLD VALUE | PHY#3 OF EXPANDER#1 PHY#4 OF EXPANDER#1 | NONE PRODUCED | NONE |
| .. | .. | .. | .. | .. | .. | .. | .. | .. |
| RG#10 | HIGH CAPACITY LOW PERFORMANCE SATA | LU#10 LU#15 LU#20 | ZONE#10 | ... TIME10:70MB/s TIME11:70MB/s | 150MB/s | PHY#1 OF EXPANDER#1 | NONE PRODUCED | ZONE#20 |
| .. | .. | .. | .. | .. | .. | .. | .. | .. |
| RG#20 | HIGH CAPACITY SAS | LU#40 LU#50 | ZONE#10 | ... TIME10:320MB/s TIME11:320MB/s | 600MB/s | PHY#1 OF EXPANDER#1 PHY#2 OF EXPANDER#1 | NONE PRODUCED | ZONE#10 |

700

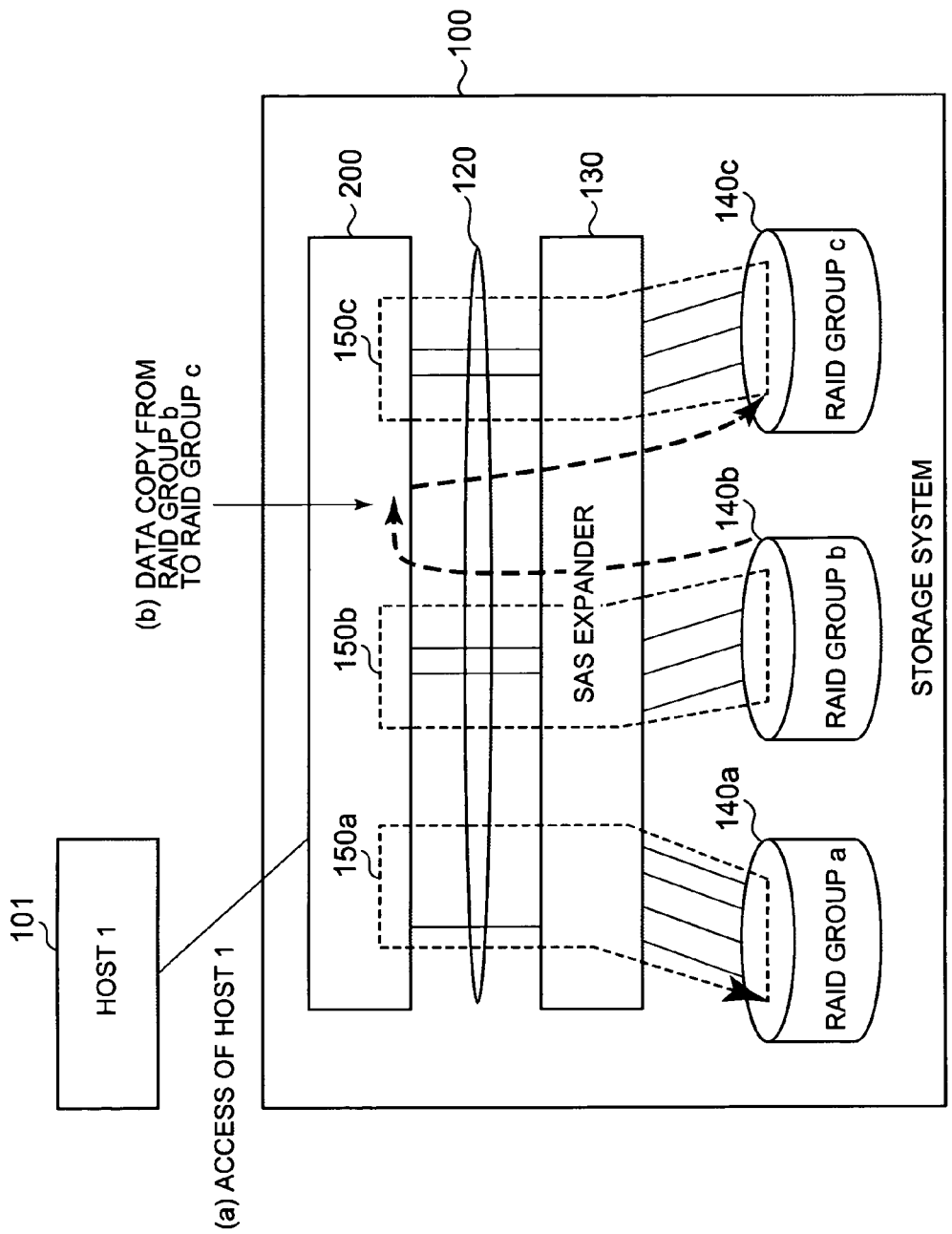

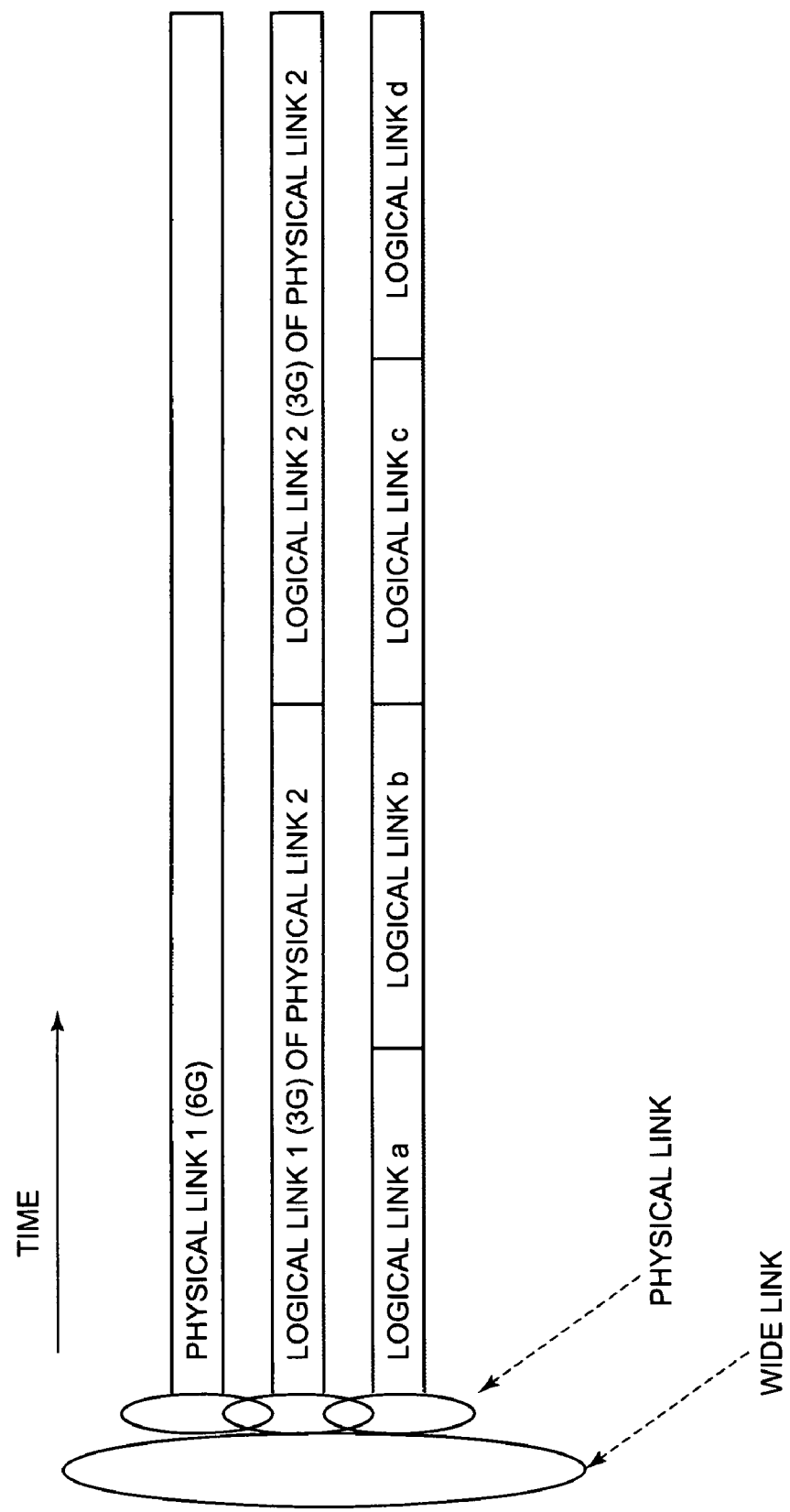

COMPUTER SYSTEM FOR CONTROLLING ALLOCATION OF PHYSICAL LINKS AND METHOD THEREOF

CROSS-REFERENCE TO PRIOR APPLICATION

This application relates to and claims priority from Japanese Patent Application No. 2006-76505, filed on Mar. 20, 2006 the entire disclosure of which is incorporated herein by reference.

BACKGROUND OF THE INVENTION

1. Field of the Invention

The present invention relates to a computer system comprising physical links, and more specifically, to a computer system in which physical links for SAS (Serial Attached SCSI)-compliant communications are provided in the backend, for example.

2. Description of the Related Art

A storage system that comprises a plurality of storage devices (disk drives such as hard disk drives and DVD (Digital Versatile Disk, for example) is known as one type of computer system. A storage system is capable of receiving an I/O command (an I/O command constituting a write command or read command) from an access source device (a host computer or other storage system, for example) and of transmitting data corresponding with the received I/O command to the access source device by writing the data to a storage device or reading the data from a storage device.

The disk device disclosed in the Japanese Patent Application Laid Open No. 2005-149173, for example, is known as a storage system of this kind. In this disk drive, a plurality of disk drives are connected to a Fiber Channel-Arbitrated Loop (FC-AL).

Further, SAS (Serial Attached SCSI) is known as a communication I/F. SAS is an I/F technology that allows disk drives of different protocol types (SCSI and ATA, for example) to be connected by the same physical wiring. As a computer system that performs SAS-compliant communications to be performed by the backend, a storage system that comprises a plurality of disk drives and a controller that controls access to each disk drive may be considered. In this case, providing the storage system with an SAS expander comprising a plurality of physical communication ports ('physical phys' hereinbelow) that is a switch for connecting disk drives for expansion may be considered. A plurality of SAS expanders can be provided and, when a controller is provided at the highest point upstream, a plurality of SAS expanders can be cascade-connected working downstream from the highest point upstream (connected in series or as a tree structure, for example). However, the controller need not be at the highest point upstream and an SAS initiator can be connected to any point of the SAS expander. A controller, an upstream SAS expander, downstream SAS expander, or disk drive can be connected to an optional physical phy of each SAS expander.

In this storage system, physical wiring ('physical link' hereinbelow) is run between the controller and an SAS expander, between SAS expanders, and between an SAS expander and disk drive in the backend. When a disk drive (SAS target) is accessed, the controller (SAS initiator) is able to access a disk drive via each physical link from the controller to the disk drive. More specifically, for example, when the disk drive connected to the first SAS expander directly below the controller is accessed, the controller is able to access the disk drive via a first physical link that links the controller and the first SAS expander and a secondary physical link that links the first SAS expander and the first SAS expander and the disk drive.

SAS includes a technology known as 'wide link' that makes it possible to collect a plurality of parallel physical links between single devices as one logical link. That is, a wide link can be formed by a plurality of parallel physical links that connect one device with another device such as between an SAS expander and another SAS expander and between an SAS initiator and an SAS expander. Further, a wide link can also be formed automatically between an SAS expander and another SAS expander or between an SAS initiator and an SAS expander without an SAS-initiator instruction.

Further, SAS includes a technology that makes it possible to form a plurality of virtual physical links ('logical links' hereinbelow) through time division of a single physical link. Therefore, a plurality of logical links can be constituted in individual physical links forming a wide link. For example, in a case where two physical links with a transfer speed of 6 Gbps are formed by a single wide link, because a 1.5 Gbps logical link with ¼ the transfer speed can be formed by means of a single physical link, a total of eight logical links can be formed in the wide link. In this case, the SAS initiator device is capable of sending and receiving frames simultaneously by establishing a connection with eight SAS target devices at the same time.

The controller is able to establish a connection at the same time with a plurality of devices via a plurality of physical links constituting the wide link. When the controller and SAS expander are connected by a wide link and a plurality of disk drives are connected to the SAS expander, the controller is able to simultaneously establish connections with a plurality of disk drives in a quantity equal to the number of physical links constituting the wide link. One controller is able to execute a frame transfer to a plurality of disk drives at the same time by means of a wide link.

A characteristic problem can arise with this storage system in each of the first and second cases below, for example.

The first case is a case where disk drives with different communication I/Fs are connected to the SAS expander. For example, this case is a case where a disk drive with an SAS I/F ('SAS drive' hereinbelow) and a disk drive with a SATA (Serial ATA) I/F ('SATA drive' hereinbelow) are connected to one or a plurality of SAS expanders, for example. This case can be implemented by using the same physical link to transfer an SSP (Serial SCSI Protocol) frame for accessing an SAS drive or SAS device and an STP (Serial ATA Tunneled Protocol) frame that tunnels the SATA protocol for accessing the SATA drive. Here, SATA and SAS have different transfer efficiencies (specifically, the transfer efficiency of SATA is inferior to the transfer efficiency of SAS and the time occupied by the physical link is longer). As a result, when there are a large number of SATA-frame I/O transfer requests, there is the possibility of an adverse effect on the throughput with respect to the SAS drive. A problem of this kind is not limited to these two types of I/F and can also exist between I/Fs of other types.

The second case is a case where two or more disk drives are one group ('RAID group' hereinbelow) that follows the rules of RAID (Redundant Array of Independent (or Inexpensive) Disks) and the RAID groups are connected to an SAS expander. Because a plurality of SAS expanders are cascade-connected, a wide link of a path from the controller to a certain RAID group and a wide link of a path from the controller to another RAID group are common on the upstream side within the backend. As a result, when access to a specified RAID group increases, there is the possibility of an adverse effect on the throughput of the other RAID groups.

The above problems are not limited to storage systems and can also exist in other types of computer system. For example, in a case where a plurality of SAS target devices exist in a computer system, when a specified SAS target device is accessed, the possibility of the throughput of the computer system dropping may be considered.

Furthermore, the procedure for selecting a physical link for executing a frame transfer from a plurality of physical links that constitute a wide link based on the restrictions of protocols such as SAS cannot be controlled by an SAS initiator device.

SUMMARY OF THE INVENTION

Therefore, an object of the present invention is to prevent a drop in the throughput of the computer system as much as possible even when there is a concentration of access to a specified SAS target device (e.g. SAS drive, SATA drive, and so on) among a plurality of SAS target devices. This object is preferably implemented without violating the restrictions of the communication protocol of the backend.

Further objects of the present invention will become evident from the following description.

The computer system according to the present invention comprises a plurality of SAS target devices constituting targets that follow the SAS protocol; an SAS initiator device constituting an initiator that follows the SAS protocol; and a switch section that is connected to each SAS target device by means of a physical link which is physical wiring and that is connected to the SAS initiator device by means of a wide link constituted by a plurality physical links. The service delivery subsystem is one or a plurality of switch devices (e.g. SAS Expander devices) and, when the service delivery subsystem is a plurality of switch devices, the switch devices are cascade-connected with one switch device connected to the SAS initiator device in the leading position and the switch devices are connected to one another by means of a wide link. The computer system further comprises a physical-link allocation control section. The physical-link allocation control section controls how many physical links of at least one wide link among the wide link in the service delivery subsystem and the wide link between the service delivery subsystem and the SAS initiator device are allocated to a particular SAS target device. An I/O from the SAS initiator device to the SAS target device is made via a physical link allocated to the SAS target device and cannot pass a physical link that is not allocated to the SAS target device.

In a first embodiment, the computer system may further comprise a monitoring section that monitors, with respect to each SAS target device, the I/O request performance which is the I/O performance requested for the SAS target device. The physical link allocation control section is able to control the number of physical links allocated to each SAS target device on the basis of the I/O request performance for each SAS target device.

In a second embodiment, the physical link allocation control section according to the first embodiment is capable of allocating a larger number of physical links to an SAS target device with a high I/O request performance than to an SAS target device with a lower I/O request performance.

In a third embodiment, SAS target devices of different communication protocols are mixed in the plurality of SAS target devices. The physical link allocation control section is able to control the number of physical links allocated to each SAS target device on the basis of the type of communication protocol of the SAS target device.

In a fourth embodiment, the physical link allocation control section according to the third embodiment is capable of allocating a larger number of physical links to an SAS target device that communicates by means of a communication protocol of a poor transfer efficiency than to an SAS target device that communicates by means of a communication protocol of a good transfer efficiency. Conversely, the physical link allocation control section is also able to allocate a larger number of physical links to an SAS target device that communicates by means of a communication protocol of good transfer efficiency than to an SAS target device that communicates by means of a communication protocol of poor transfer efficiency.

In a fifth embodiment, each SAS target device is a storage device. Two or more storage devices may constitute a RAID group as a result of grouping in accordance with RAID rules. The physical link allocation control section is able to control the number of allocated physical links in RAID group units.

In a sixth embodiment the computer system may further comprise a zone setting section that performs zone setting in which an access path from the SAS initiator device to the plurality of SAS target devices is divided into a plurality of logical zones. The physical link allocation control section is able to control the number of physical links allocated to each SAS target device on the basis of the set plurality of zones.

In the seventh embodiment, when a plurality of SAS target devices belong to one zone, the physical link allocation control section according to the sixth embodiment is able to control the number of physical links allocated to each of the plurality of SAS target devices within the range of this one zone.

In an eighth embodiment, the computer system may further comprise a resource monitoring section that issues at fixed intervals a resource monitoring command for monitoring the resource (SAS target device, for example) of an enclosure connecting the plurality of SAS target devices at fixed intervals. In this case, the zone setting section is able to set an I/O dedicated zone that is used for I/Os with respect to the SAS target devices and that is not used to issue the resource monitoring command and a resource monitoring dedicated zone that is used to issue the resource monitoring command and that is not used for I/Os.

In the ninth embodiment, the SAS initiator device according to the first embodiment is able to receive an I/O request from an access source that exists outside the computer system, perform a first I/O with respect to a first SAS target device corresponding with the I/O request, and perform a second I/O with respect to a second SAS target device by means of a backend irrespective of the I/O request from the access source. The physical link allocation control section is able to control the number of physical links allocated to the first SAS target device and the number of physical links allocated to the second SAS target device on the basis of the I/O request performance of the first I/O and the I/O request performance of the second I/O respectively.

In the tenth embodiment, the physical link allocation control section according to the ninth embodiment is able to allocate a larger number of physical links to the first SAS target device than to the second SAS target device when the I/O request performance of the first I/O is higher than the I/O request performance of the second I/O.

In the eleventh embodiment, the SAS initiator device is able to receive an I/O request from a plurality of access sources that exist outside the computer system and performs an I/O with respect to the SAS target device corresponding with the I/O request. The physical link allocation control section is able to allocate, based on the respective priority levels of the plurality of access sources, a larger number of physical links to an SAS target device corresponding with an I/O request from an access source of higher priority than to an SAS target device corresponding with an I/O request from an access source of a lower priority.

In the twelfth embodiment, the physical link allocation control section is able to prevent an I/O with respect to a certain SAS target device by making the number of physical links allocated to the certain SAS target device zero or releasing the allocation of physical links connecting the certain SAS target device and the service delivery subsystem, in at least one wide link among the wide link between the service delivery subsystem and the SAS initiator device and the wide link in the service delivery subsystem.

In the thirteenth embodiment, each of the one or plurality of switch devices can comprise a plurality of communication ports respectively connected to a plurality of physical links and a storage area that stores switch control information. The switch control information records, for each of the plurality of communication ports, direct device data representing devices that are directly attached without the interposition of another communication port and indirect device data representing SAS target devices that are connected indirectly via another communication port. When the direct device data for the communication ports are data representing SAS target devices, the SAS target device can be an SAS target device to which physical links connected to the communication ports are allocated. The indirect device data for the communication ports can be data representing SAS target devices to which physical links connected to the communication ports are allocated. The physical link allocation control section controls the physical links allocated to the SAS target devices by updating the switch control information for at least one switch device of the one or plurality of switch devices.

In the fourteenth embodiment, if each of the one or plurality of switches according to the thirteenth embodiment receives a connection request for establishing a connection with a certain SAS target device via a physical link that is not allocated to the certain SAS target device, an error can be sent back to the source that issued the connection request via the physical link so that a connection is not established via the physical link.

In the fifteenth embodiment, a management terminal for managing the computer system may be communicably connected to the computer system. The physical link allocation control section is able to control how many physical links are allocated to a particular SAS target device in accordance with an instruction from the management terminal.

In the sixteenth embodiment, the computer system may be a storage system comprising a plurality of storage devices. The plurality of SAS target devices may be the plurality of storage devices. The SAS initiator device may be a controller for controlling I/Os with respect to the respective storage devices. The service delivery subsystem may be a plurality of switch devices. Each of the plurality of switch devices can comprise a plurality of communication ports respectively connected to a plurality of physical links and a storage area for storing switch control information. The switch control information may record, for each of the plurality of communication ports, direct device data representing devices that are directly attached without the interposition of another communication port and indirect device data representing storage devices that are connected indirectly via another communication port. When the direct device data for the communication ports are data representing storage devices, the storage devices can be storage devices to which physical links connected to the communication ports are allocated. The indirect device data for the communication ports can be data representing storage devices to which physical links connected to the communication ports are allocated. The storage system may further comprise a monitoring section for monitoring, for each of the storage devices, the I/O request performance which is the I/O performance requested for the storage device. The physical link allocation control section can control the number of physical links allocated to each of the storage devices by updating the switch control information for at least one of the plurality of switch devices on the basis of the I/O request performance with respect to each storage device.

In the seventeenth embodiment, two or more storage devices according to the sixteenth embodiment can form a RAID group as a result of grouping in accordance with RAID rules and the physical link allocation control section can control the number of allocated physical links in RAID group units.

In the eighteenth embodiment, the computer system may be a storage system comprising a plurality of storage devices. The plurality of SAS target devices may be the plurality of storage devices. The plurality of storage devices may be a mix of a SCSI storage device, which is a storage device that performs communications that follow the SCSI protocol, and an ATA storage device, which is a storage device that performs communications that follow the ATA protocol. The SAS initiator device may be a controller that controls I/Os with respect to the respective storage devices. The service delivery subsystem may be a plurality of switch devices. Each of the plurality of switch devices can comprise a plurality of communication ports connected to a plurality of physical links and a storage area that stores switch control information. The switch control information may record, for each of the plurality of communication ports, direct device data representing devices that are directly attached without the interposition of another communication port and indirect device data representing storage devices that are connected indirectly via another communication port. When the direct device data for the communication ports are data representing storage devices, the storage devices may be storage devices to which physical links connected to the communication ports are allocated. The indirect device data for the communication ports may be data representing storage devices to which physical links connected to the communication ports are allocated. The physical link allocation control section can control the number of physical links allocated to each of the storage devices by updating the switch control information for at least one of the plurality of switch devices on the basis of whether the communication protocol of each storage device is SCSI or ATA.

In the nineteenth embodiment, the physical links whose allocation is controlled may be virtual physical links. The virtual physical links are logical links formed by time-dividing one physical link. The I/O from the SAS initiator device to the SAS target device is made via a logical link that is allocated to the SAS target device and cannot pass a logical link that is not allocated to the SAS target device. The SAS initiator device is capable of establishing a connection at the same time as a plurality of the SAS targets by means of a logical link of one physical link.

The respective parts above may be called the respective means. The respective parts can also be implemented by hardware (circuits, for example) and computer programs or a combination thereof (for example, one or a plurality of CPUs that read and execute computer programs). Each computer program can be read from a storage resource (memory, for example) contained in a computer machine. Each computer program can be installed on the storage resource via a recording medium such as a CD-ROM or DVD (Digital Versatile Disk) or can be downloaded via a communication network such as the Internet or a LAN.

Further, at least one of the control units or monitoring sections to which the above physical link is allocated may be installed in an SAS initiator device.

Further, for example, said 'service delivery subsystem' is the part of a SCSI I/O system that transmits information between a SCSI initiator port and a SCSI target port.

BRIEF DESCRIPTION OF THE DRAWINGS

FIG. 4 shows a constitutional example of a direct device table 195a in an SAS expander 130a and information that is registered in the table 195a;

FIG. 6 shows a constitutional example of an expander route table 196a in an SAS expander 130a and information that is registered in the table 196a;

FIG. 7 shows a constitutional example of an expander route table 196b in an SAS expander 130b and information that is registered in the table 196b;

FIG. 11 shows a constitutional example of a zone state management table 700;

FIG. 13 shows the allocation of physical links prior to changing the allocation in a second case where the allocation of the physical links is changed;

FIG. 22 shows an example in which a physical link and a logical link are mixed in one wide link.

DESCRIPTION OF THE PREFERRED EMBODIMENTS

A storage system in which a computer system according to a first embodiment of the present invention will be described hereinbelow by way of example with reference to the drawings.

Figure 1:
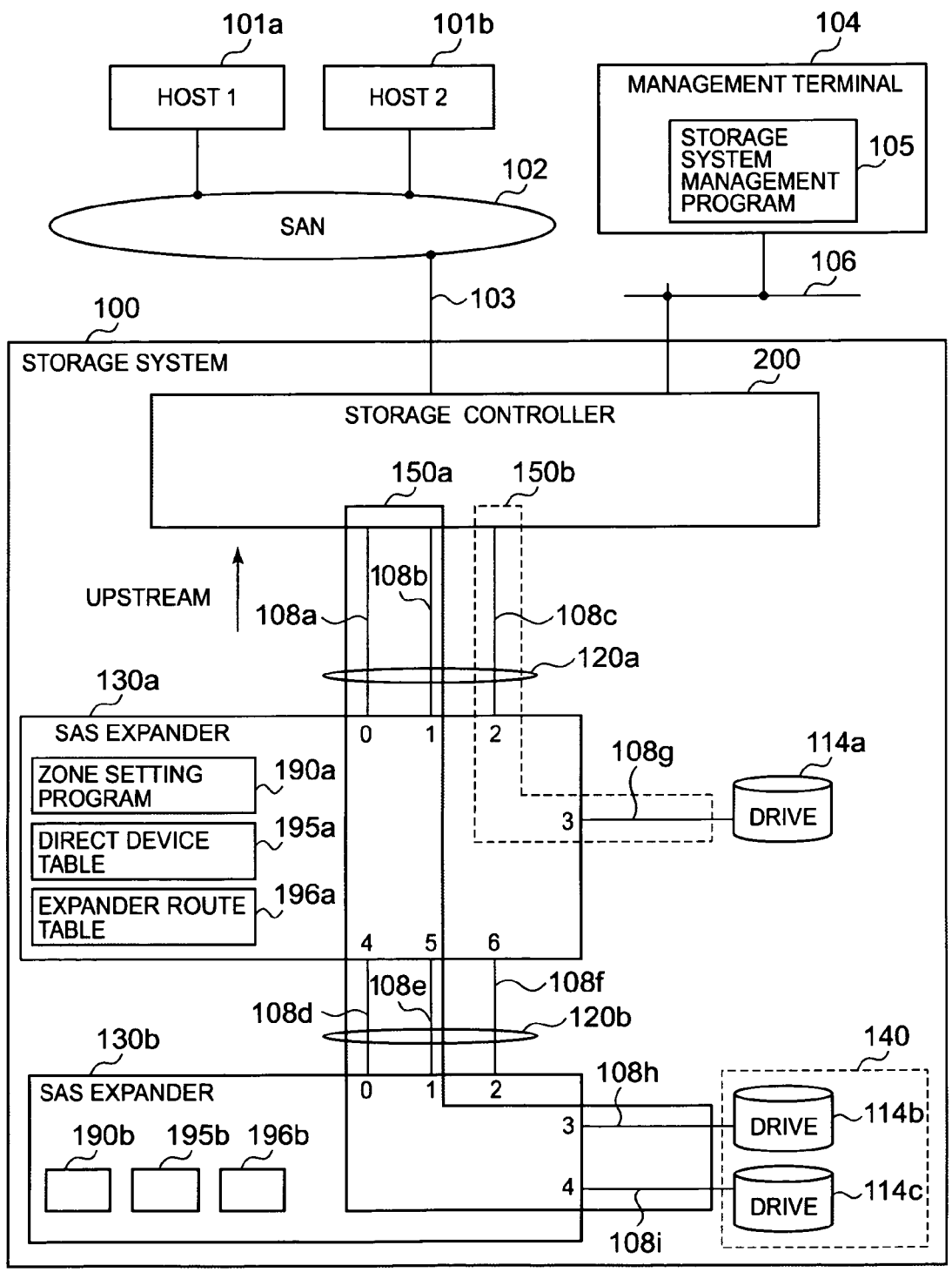
FIG. 1 is a block diagram showing a constitutional example of the storage system of a first embodiment of the present invention.

FIG. 1 is a block diagram showing a constitutional example of the storage system of a first embodiment of the present invention. The description is provided hereinbelow by adding the same parent numbers to elements of the same type and adding child numbers to the parent numbers when elements of the same type are described individually.

A storage system 100 can be connected by an interface 103 such as an FC (Fiber Channel), a SCSI (Small Computer System Interface), SAS (Serial Attached SCSI), or IP (Internet Protocol) to a SAN (storage area network) 102 to which one or a plurality (two, for example) of host computers 101a and 101b are connected. Further, the storage system 100 can also be connected to a management network 106 to which a management terminal 104 is connected, for example. Various networks (such as a LAN (Local Area Network), for example) can be adopted as the management network 106. Another type of network may be adopted in place of the SAN 102. Further, the management network 106 and SAN 102 may be one communication network.

Each of the host computers 101a and 101b is a computer comprising hardware resources such as a CPU, a memory, and an I/O port to be used for communicating with the storage system 100, for example. Each of the host computers 101a and 101b is able to access data in the storage system 100 via the SAN 102.

The management terminal 104 is a computer comprising hardware resources such as a CPU, an I/O device, a memory, and an interface. The CPU of the management terminal 104 is able to control the storage system 100 by executing a storage system management program 105 (operating instruction for configuration information acquisition, for example).

The storage system 100 comprises a plurality of disk drives 114 that are capable of storing data, one or a plurality of SAS expanders 130 which are switches for connecting the disk drives 114 for expansion, and one or a plurality of storage controllers 200 that control the storage system 100. The disk drives 114 are hard disk drives but disk drives of other types such as DVD (Digital Versatile Disk) drives and CD (Compact Disk) drives may also be adopted. Where the physical links 108 that are connected to the SAS expander 130 are concerned, disk drives 114 that use different protocols can be connected to the same physical link 108. The physical link 108 can transfer frames of protocols supported by the drives 114. The SAS expander 130 can be constituted by a hardware circuit base.

FIG. 1 shows three disk drives 114a, 114b, and 114c, two SAS expanders 130a and 130b, and one storage controller 200 by way of example. The following description is provided by suitably using this example. Further, in the following description, the storage controller 200 is at the highest point upstream.

Two SAS expanders 130a and 130b are cascade-connected from an upstream position to a downstream position. In this example, because there are two SAS expanders, there is a serial connection. However, when there are three or more SAS expanders, a tree structure may be used with the SAS expander 130a in the leading position.

The storage controller 200 and the SAS expander 130a directly below same are connected by a plurality of physical links 108a, 108b, and 108c, and one wide link 120a is formed by the plurality of physical links 108a, 108b, and 108c. Likewise, the SAS expander 130a and SAS expander 130b are also connected by a plurality of physical links 108d, 108e, and 108f and a wide link 120b is formed by the plurality of physical links 108d, 108e, and 108f. An ID is allocated to each of the SAS expanders 130a and 130b in order to identify the ports to which the physical links are connected (the each port could be called 'physical phy' hereinbelow). 'Physical phy' is a phy that contains a transceiver and electrically interfaces to a physical link to communicate with another physical phy. 'phy' is an object in a device that is used to interface to other devices (e.g. an expander phy or a SAS phy). In this embodiment, phy identifier 0 of the SAS expander 130a corresponds with physical link 108a, phy identifier 1 of the SAS expander 130a corresponds with physical link 108b, phy identifier 2 of the SAS expander 130a corresponds with physical link 108c, phy identifier 3 of the SAS expander 130a corresponds with physical link 108g, phy identifier 4 of the SAS expander 130a corresponds with physical link 108d, phy identifier 5 of the SAS expander 130a corresponds with physical link 108e, and phy identifier 6 of the SAS expander 130a corresponds with physical link 108f. Likewise, phy identifier 1 of the SAS expander 130b corresponds with physical link 108d, phy identifier 2 of the SAS expander 130b corresponds with physical link 108e, phy identifier 3 of the SAS expander 130b corresponds with physical link 108f, phy identifier 4 of the SAS expander 130b corresponds with physical link 108h, and phy identifier 5 of the SAS expander 130b corresponds with physical link 108i. 'phy identifier' is an identifier for a phy that is unique within the device containing it.

The phy identifiers 4 to 6 of the SAS expander 130a are established as downstream physical phys. The phy identifiers 1 to 3 of the SAS expander 130b are established as upstream physical phys. From the perspective of the SAS expander 130b, the SAS expander 130a is an upstream device.

A plurality of disk drives 114 may be constituted only by disk drives that perform communications by means of the same type of protocol (in other words, comprising the same type of I/F) or disk drives of different protocols may be mixed. As an example of the latter, a disk drive with a SCSI I/F ('SCSI drive' hereinbelow) and a disk drive with an ATA I/F ('ATA drive' hereinbelow), for example, may be mixed. A disk drive with an SAS I/F can be adopted as the SCSI drive. A disk drive with a SATA I/F (or PATA (Parallel ATA) I/F) can be adopted as the ATA drive. Further, when a PATA I/F drive is adopted, processing (PATA and SATA physical layer conversion) to convert serial transmission to parallel transmission is performed by means of communication between this drive and the SAS expander 130.

The disk drive 114 sometimes also has a plurality of physical phys with the object of redundancy within the storage system 100. For example, when the disk drive 114 is a SATA drive, a SATA port selector is sometimes interposed between the SAS expander 130 and the SATA drive (a SATA port selector is not shown in FIG. 1) in order to increase the number of ports with the object of redundancy.

The disk drive 114a is connected to phy identifier 3 of the SAS expander 130a via the physical link 108g. Disk drive 114b is connected to phy identifier 4 of the SAS expander 130b via the physical link 108h. Disk drive 114c is connected to phy identifier 5 of the SAS expander 130b via the physical link 108i.

The disk drives 114b and 114c constitute a group according to RAID rules ('RAID group' hereinbelow) 140. One RAID group 140 can be constituted by a plurality of disk drives 114 but each of the plurality of disk drives 114 may be connected to one SAS expander 130 or may be connected to different SAS expanders 130, under the governance of one storage controller 200. Alternatively, the plurality of disk drives 114 may be governed by different storage controllers 200. That is, the RAID group 140 can be constituted to extend across a plurality of SAS expanders 130 and can be constituted to extend across a plurality of storage controllers 200.

The SAS expander 130 comprises a storage area (memory, for example). The storage area stores a zone setting program 190, a direct device table 195, and an expander route table 196. Information on devices that are directly attached to the SAS expander 130 comprising this table 195 is stored in the direct device table 195. On the other hand, information on devices that are indirectly attached to the SAS expander 130 comprising the table 196 is recorded in the expander route table 196. Tables 195 and 196 may be integrated.

The zone setting program 190 changes the content of the direct device table 195 and/or expander route table 196 by means of an instruction from an SAS expander control program 320 (FIG. 3) in the storage controller 200 and, as a result, the setting of zone 150 can be changed. Details of the direct device table 195, expander route table 196, and zone 150 will be provided subsequently.

One or a plurality of zones 150 can be established virtually in the storage system 100. The storage system 100 is capable of controlling the allocation of physical links on the basis of the setting of the zone 150. Zone 150 can be set on the basis of various conditions. More specifically, zone 150 can be set on the basis of the protocol type of the disk drive 114 or in units of the RAID group 140, for example.

The zone 150a exemplified by FIG. 1 comprises physical links 108a, 108b, physical links 108d and 108e, and physical links 108h and 108i. In this case, when the storage controller 200 accesses the RAID group 140, either of the physical links 108a and 108b in the wide link 120a is used and the physical link 108c not contained in zone 150a is not used.

Meanwhile, zone 150b exemplified by FIG. 1 contains physical links 108c and 108g. As a result, when the storage controller 200 accesses the disk drive 114a, only physical link 108c is adopted by the wide link 120a and the physical links 108a and 108b that are not contained in zone 150a are not used.

Figure 2:
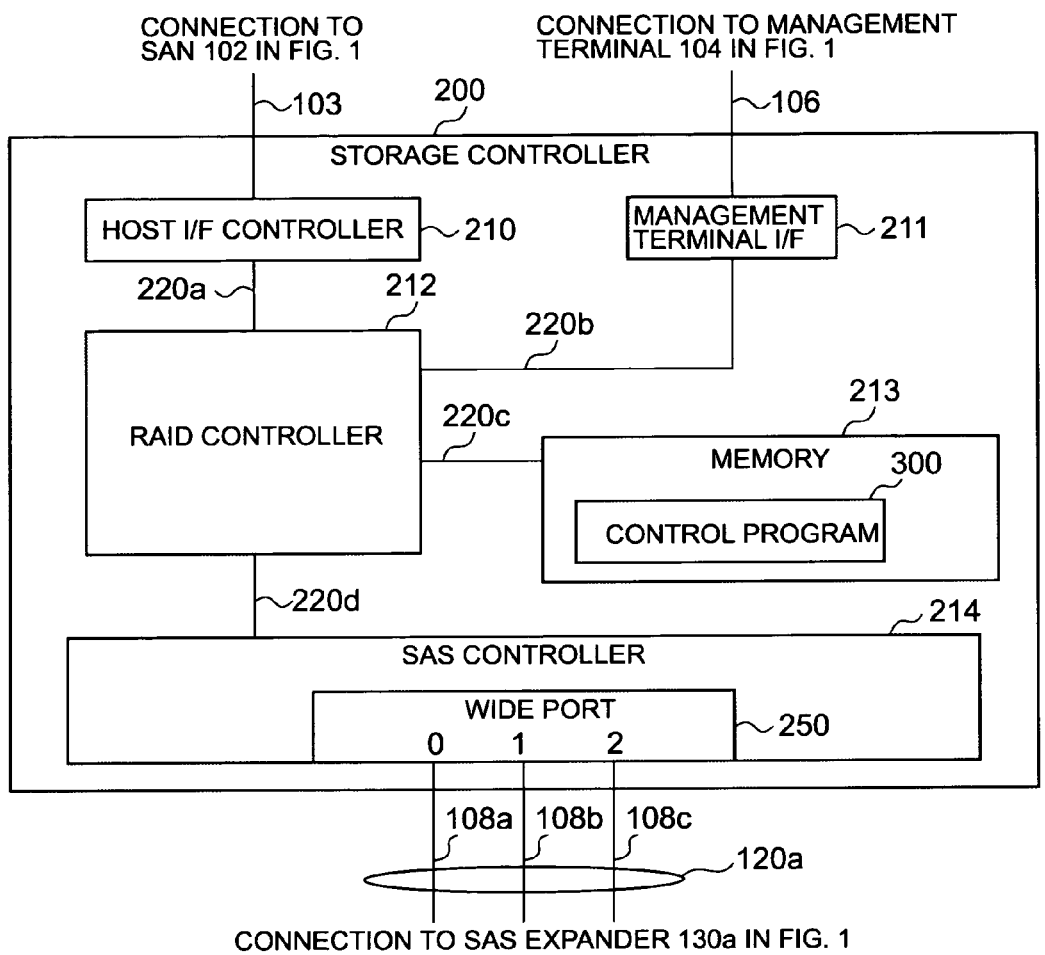
FIG. 2 is a block diagram showing a constitutional example of a storage controller 200.

FIG. 2 is a block diagram showing a constitutional example of the storage controller 200.

The storage controller 200 comprises a host I/F controller 210, a management terminal I/F 211, a RAID controller 212, a memory 213, and an SAS controller 214. At least one of the host I/F controller 210, SAS controller 214, RAID controller 212 and memory 213 may be limited to one or may be provided in a plurality.

The host I/F controller 210 is communicably connected to a host 101 via the SAN 102 by means of the interface 103 in FIG. 1. The host I/F controller 210 is capable of controlling the conversion of the protocol for communications between the host computer 101 and RAID controller 212.

The management terminal I/F 211 is communicably connected to the management terminal 104 via the management network 106 of FIG. 1. The management terminal I/F 211 is capable of controlling the conversion of the protocol for communications between the management terminal 104 and RAID controller 212.

The host I/F controller 210, management terminal I/F 211, memory 213, and the SAS controller 214 are connected to the RAID controller 212 by buses 220a, 220b, 220c, and 220d. Bus 220 is a PCI or PCI-Express or the like, for example.

The memory 213 stores a control program 300 and is read to and executed by the RAID controller 212. Details on the control program 300 will be provided subsequently.

The SAS controller 214 is capable of controlling conversion of the protocol for communications between the SAS expander 130 and the RAID controller 212. The SAS expander 214 comprises a wide port 250. The wide port 250 is a port constituted by two or more physical phys and is connected to the SAS expander 130a via the wide link 120a. The SAS controller 214 may comprise a plurality of wide ports 250. In other words, when a plurality of SAS expanders 130 are connected to the SAS controller 214, the SAS controller 214 comprises a plurality of wide ports 250.

The RAID controller 212 can comprise a microprocessor, a bridge for data transfers (LSI (Large Scale Integration), for example), and a RAID control logic circuit (an exclusive OR X-or engine, for example), for example. The processor, bridge, and RAID control logic circuit and so forth in the RAID controller 212 may be divided between a plurality of chips.

Upon receipt of a write command from the host computer 101, the storage controller 200 is capable of temporarily storing data corresponding with the write command in the memory 213 and writing the data stored in the memory 213 to the disk drive 114. On the other hand, when the storage controller 200 receives a read command from the host computer 101, the storage controller 200 is able to read data corresponding with the read command from the disk drive 114, store the data thus read temporarily to the memory 213, and transmit the data stored in the memory 213 to the host computer 101.

Figure 3:
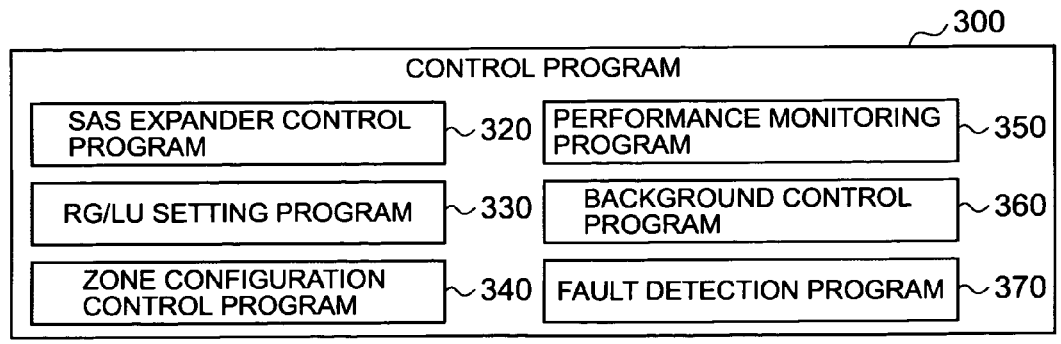
FIG. 3 is a constitutional example of a control program 300.

FIG. 3 shows a constitutional example of the control program 300.

The control program 300 comprises an SAS expander control program 320, an RG/LU setting program 330, a zone configuration control program 340, a performance monitoring program 350, a background control program 360, and a fault processing program 370, for example.

The SAS expander control program 320 issues an inquiry to the direct device table 195 in the SAS expander 130 and, as a result, is able to acquire the physical mount positions of the disk drive 114 and SAS expander 130.

Furthermore, the SAS expander control program 320 is able to register the addresses of devices that are indirectly attached downstream and set route information in the expander route table 196. In the case of the expander route table 196a of the SAS expander 130a, an indirectly attached device is a device that is not directly attached to the respective physical phys of the SAS expander 130a and is capable of access from this physical phy via at least one other physical phy. More specifically, stated with respect to the example in FIG. 1, the indirectly attached devices of phy identifiers 0 and 1 are disk drives 114b and 114c and the indirectly attached device of phy identifier 2 is disk drive 114a. Therefore, in order to establish a connection with the disk drives 114b and 114c, for example, potential pathway information for reaching the disk drives 114b and 114c must be registered in the expander route table 196a of the SAS expander 130a. 'Potential pathway' is a set of physical links between a SAS initiator phy and a SAS target phy.

The SAS expander control program 320 is also capable of acquiring the number of the plurality of physical links 108 constituting the wide link 120 and an ID for identifying each physical link (for identifying the phy identifier of the SAS expander) and registering the number and ID in the direct device table 195. In other words, the SAS expander 130 is able to hold the wide link 120, the number of physical links 108 constituting the wide link 120 and the ID for identifying the physical links in the direct device table 195 of the SAS expander.

The RG/LU setting program 330 is a program for setting the RAID group 140 and setting an LU (logical unit) in the RAID group 140. The LU is also called the logical volume. The host computer 101 issues an I/O command for designating the LUN (logical unit number) which is an ID for identifying the LU. The storage controller 200 is able to use the LUN designated by the host computer 101 to specify the RAID group 140 corresponding with the LUN and access the specified RAID group 140.

The zone configuration control program 340 is a program for changing the settings of the zone 150. The zone configuration control program 340 is capable of determining settings for logically allocating a physical link 108 constituting the wide link 120 to the disk drive 114 or RAID group 140 and issuing a request for a zone change to the zone setting program 190 of the SAS expander 130. Further, because the zone configuration control program 340 co-operates with the storage system management program 105 operated by the administrator, the settings of the zone 150 can also be changed by means of manual operation by the administrator.

The performance monitoring program 350 is a program for estimating the I/O requests of the host computer 101 or background control program 360 and generating statistical information on performance. The performance monitoring program 350 is capable of generating performance statistical information by means of the history of past I/O characteristics and the estimated performance.

The background control program 360 is a computer program executed by the backend. The background control program 360 is a program that executes a correction copy of the RAID group 140, and data transfers and copies between disk drives 114, and so forth, for example. The background control program 360 is a generic term for a program related to I/O processing that is executed in storage. Subsequently, because an I/O executed by the background control program 360 is not an I/O that is performed in accordance with an I/O request from the host computer 101, this I/O is known as an internal I/O. Further, the copying or movement of data is not limited to copying or movement within the storage system 100. Copying (so-called remote copying) to a disk drive within the external storage system or movement if possible, for example, is also acceptable.

The fault processing program 370 is a program for detecting various faults of the storage system 100. More specifically, for example, the fault processing program 370 is constituted to detect a fault when a fault occurs in a physical link 108 constituting the wide link 120 and to execute processing that corresponds with the fault.

The direct device table 195 and expander route table 196 will be described next and zone control will be described at such time.

Figure 4:
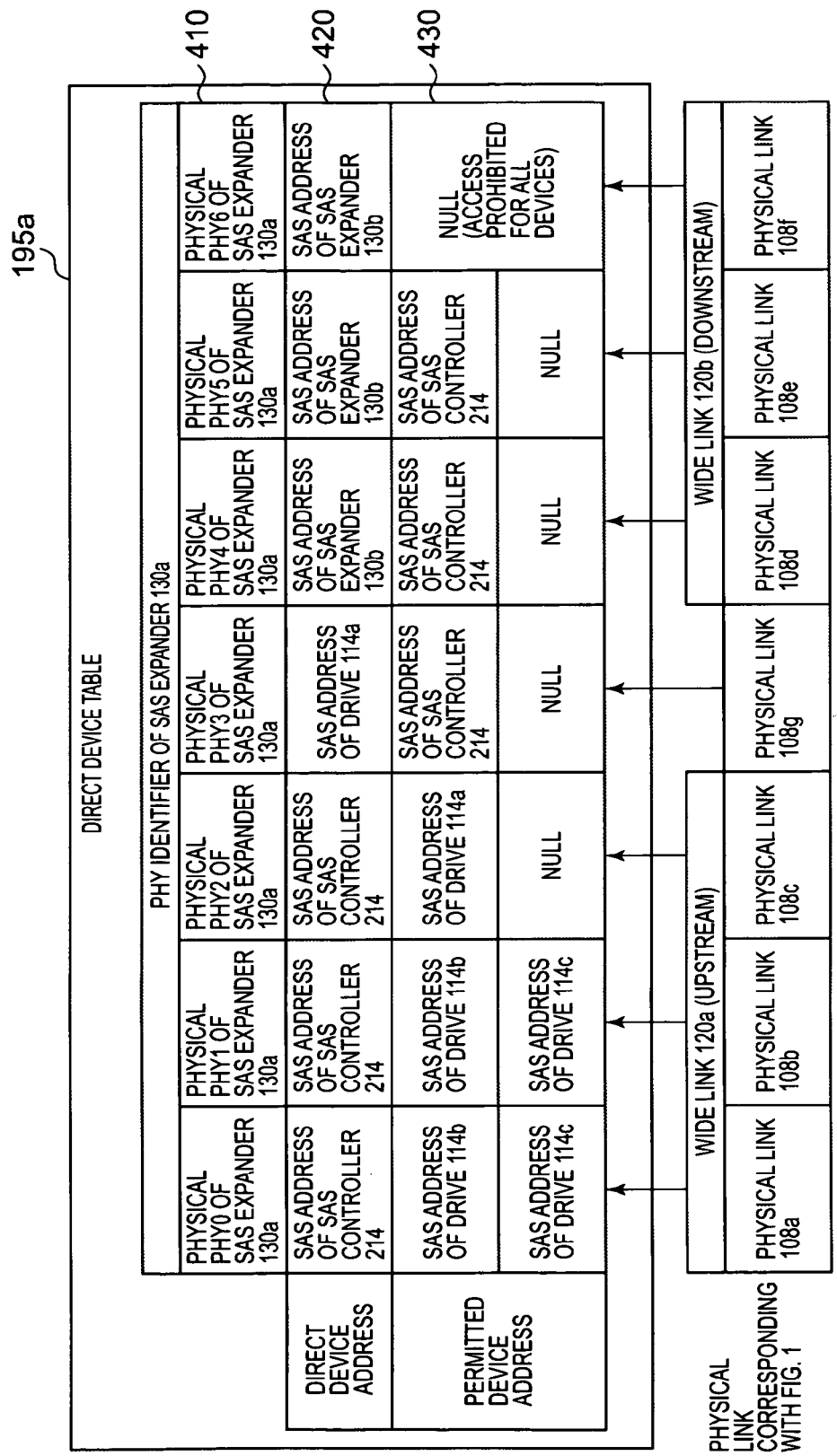
Figure 5:
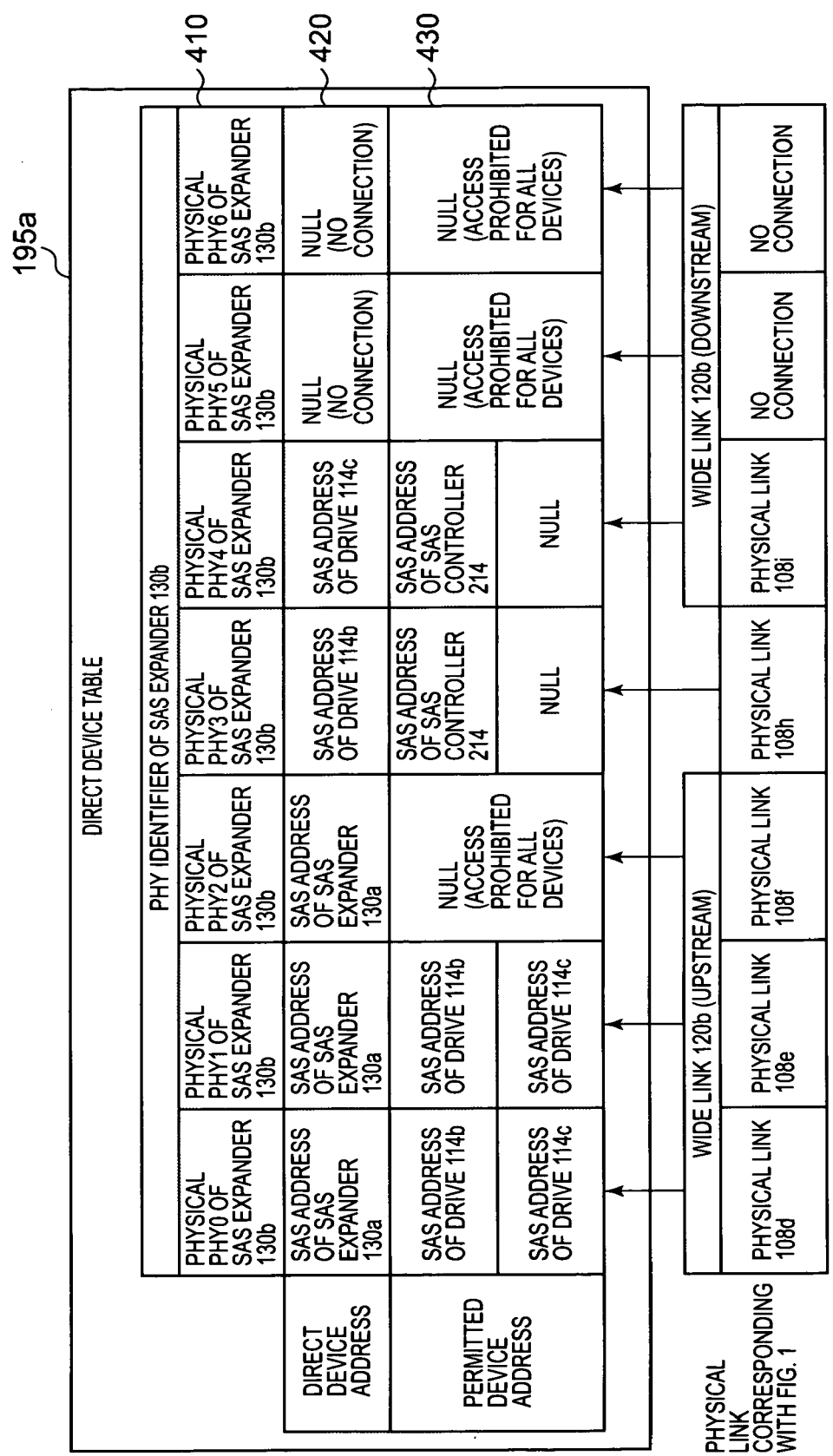
FIG. 5 shows a constitutional example of a direct device table 195b in an SAS expander 130b and information that is registered in the table 195b.

FIG. 4 shows a constitutional example of the direct device table 195a in the SAS expander 130a and information that is registered in the table 195a. FIG. 5 shows a constitutional example of the direct device table 195b in the SAS expander 130b and information that is registered in the table 195b. FIG. 6 shows a constitutional example of an expander route table 196a in the SAS expander 130a and information that is registered in the table 196a. FIG. 7 shows a constitutional example of an expander route table 196b in the SAS expander 130b and information that is registered in the table 196b.

The direct device table 195 is a table for associating devices that are directly attached to the SAS expander 130 (drives and SAS controllers and so forth) with the phy identifier of the SAS expander 130. Further, information for managing the zone setting is also saved in the direct device table 195.

FIG. 4 will now be described. A plurality of phy identifiers that correspond with each of the plurality of physical phys of the SAS expander 130a are recorded in fields 410 of the direct device table 195a. The SAS-compliant addresses ('SAS addresses' hereinbelow) of the devices that are directly attached to the physical phy are recorded for each of the physical phys of the SAS expander 130a in fields 420. The SAS addresses of devices that permit transmission ('permitted devices' hereinbelow) are recorded for each physical phy of the SAS expander 130a in field 430. The permitted devices are the access source of the back end of the storage system 100. The access source is different depending on whether data is sent from upstream to downstream or from downstream to upstream. In the former case, the access source is the SAS controller 214 and, in the latter case, the access source is the device drive 114. Consequently, in this embodiment, the permitted device is either the SAS controller 214 or disk drive 114.

In the case of the connection configuration exemplified by FIG. 1, a device that is directly attached to the physical phy of phy identifier 0 of the SAS expander 130a is the SAS controller 214. Accordingly, the SAS expander 130a registers the SAS address of the SAS controller 214 in a field corresponding with a phy identifier 0 in fields 420. The SAS expander 130 also registers information representing the connection configuration exemplified by FIG. 1 also for the other phy identifiers.

Further, in the case of zone 150a in FIG. 1, the device using phy identifier 0 of the SAS expander 130a is either disk drive 144b or 144c. Accordingly, the zone configuration control program 340 registers the SAS addresses of the disk drives 144b and 144c in field 430 as permitted devices corresponding with phy identifier 0. The zone configuration control program 340 likewise registers the SAS address of the permitted device corresponding with each phy identifier in accordance with zone 150a and zone 150b in FIG. 1 also for the other phy identifiers. Further, NULL in field 430 signifies that there is no permitted device. Hence, when there is no permitted device at all as per the phy identifier 6 of the SAS expander 130a (See FIG. 1), all NULL are recorded in the fields of the permitted devices (fields of field 430).

Moreover, a wide link and a plurality of physical links constituting the wide link can be associated in the direct device table 195a. Thereupon, information representing whether the wide link is upstream from the perspective of the SAS expander 130a having the table 195a can be established. As a result, the SAS expander 130a is able to distinguish via which wide link data from the disk drive 140 may flow upstream. According to table 195a, when an I/O for disk drive 144a is received from the physical phy of phy identifier 2 on the upstream side, the SAS expander 130a is capable of outputting the I/O from the physical phy of phy identifier 3 because it can be seen from table 195a that the disk drive 144a is directly attached to the physical phy of phy identifier 3.

FIG. 5 will be described next (a description of the points in common with the description of FIG. 4 will be omitted or simplified here).

Information representing the connection configuration exemplified by FIG. 1 is also registered in the table 195b in FIG. 5. That is, because the SAS expander 130a is directly attached to the physical phy of phy identifier 0 of the SAS expander 130b, for example, the SAS address of the SAS expander 130a is registered in a field of fields 410 that corresponds with phy identifier 0. Further, because a device that is directly attached to the physical phys of phy identifiers 5 and 6 of the SAS expander 130b, for example, does not exist, NULL is registered in fields of fields 410 that correspond with phy identifiers 5 and 6. According to table 195a, when an I/O for disk drive 144b is received from the physical phy of phy identifier 1 on the upstream side, the SAS expander 130b is capable of outputting the I/O from the physical phy of phy identifier 3 because it can be seen from table 195b that disk drive 144b is directly attached to the physical phy of the phy identifier 3.

As described hereinabove, in this embodiment, a phy identifier (may be an ID of another type), an SAS address (may also be information of another type) representing a device that is directly attached to the physical phy, and an SAS address (may also be information of another type) representing an access source device that allows its physical phy to be bypassed are recorded in the direct device table 195 for each physical phy of the SAS expander 130 comprising the table 195.

The expander route table 196 will be described next. The expander route table 196 is a table that holds information on devices that are indirectly attached to the downstream side of the SAS expander 130 that comprises the table 196 (connected with at least one physical phy isolated). The wide port 250 (Logical port) of the SAS expander 130 that designates the Subtractive attribute of the SAS standard is called the 'downstream port' hereinbelow and the wide port of the SAS expander 130 that designates the Table attribute of the SAS standard will be called the 'upstream wide port' hereinbelow. Where the registered content of the expander route table 196 is concerned, per an expander route table of the SAS standard, when another SAS expander 130 is connected to the downstream wide port of a certain SAS expander 130 and an indirectly attached device is connected to the other SAS expander 130, the SAS expander control program 320 must register the SAS address of the indirectly attached device in the expander route table 196 of the upstream SAS expander 130.

FIG. 6 will now be described. Because the SAS expander 130b is connected to the downstream wide port of the SAS expander 130a in FIG. 1, the SAS expander control program 320 registers the SAS address of the indirectly attached device (disk drive 144b or 144c) that performs access via the wide link 120a in FIG. 1 in fields 510 that correspond with the numbers of each physical phy constituting the wide link 120a of the expander route table 196a (further, 'Physical Phy' in FIG. 6 represents a physical phy). According to Table 196a, when an I/O for disk drive 144b is received from upstream, the SAS expander 130a is able to output the I/O from the physical phys of phy identifiers 4 or 5 because it can be seen from Tables 195a and 196a that the disk drive 144b is an indirectly attached device that is allocated to downstream phy identifier 4 or 5.

FIG. 7 will now be described. In FIG. 1, where the SAS expander 130b is concerned, another SAS expander 130 is not connected to the downstream wide port of the SAS expander 130b. As a result, the fields 510 of the expander route table 196b are all unregistered.

Figure 21:
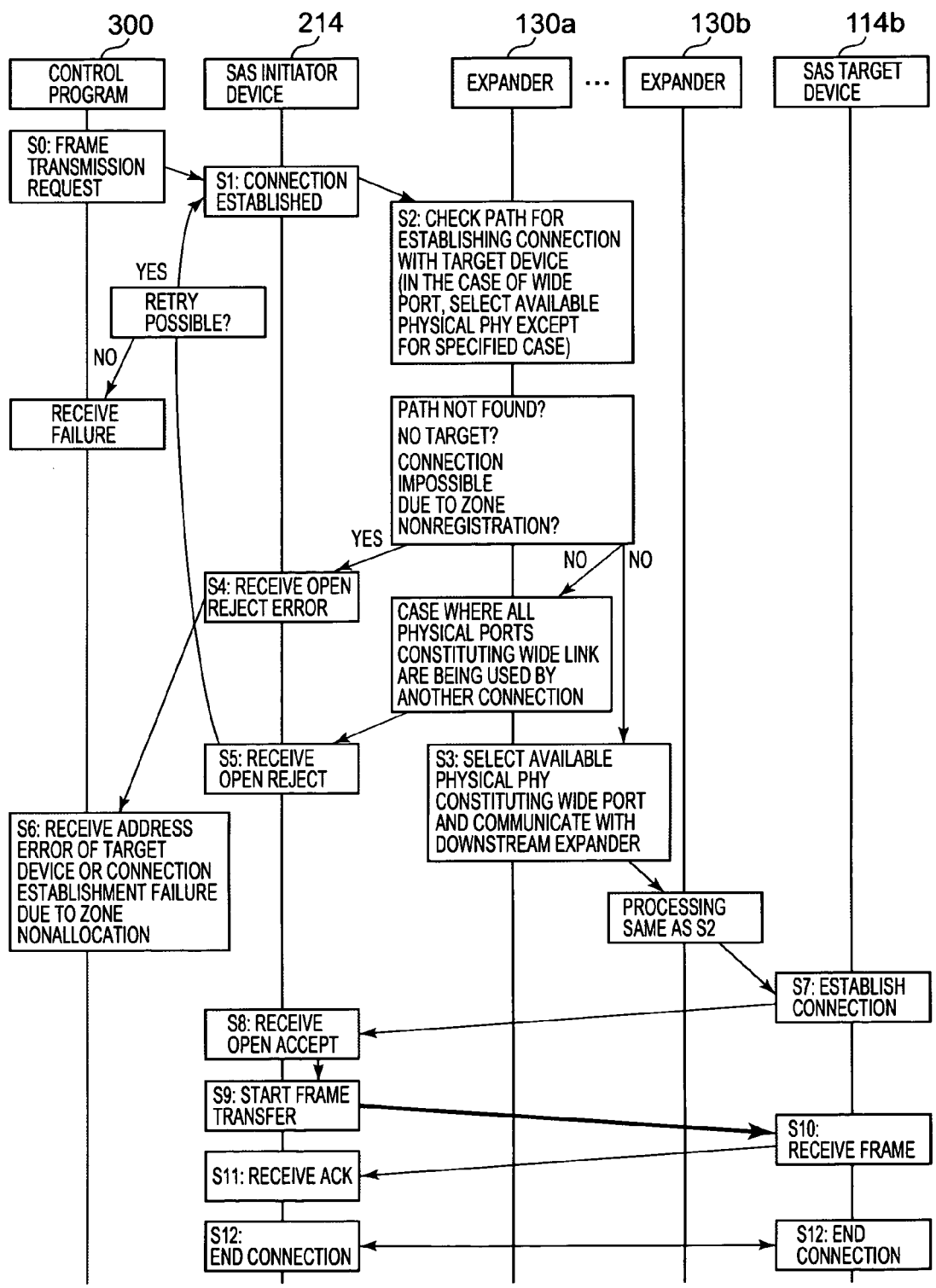
FIG. 21 shows an example of the flow of processing to establish a connection between an SAS target device and an SAS initiator device.

As a result of the constitution of the respective tables exemplified in FIGS. 4 to 7, control of access to each of the disk drives 114 can be performed by the storage controller 200, for example. Control in each case will be described hereinbelow with reference to FIG. 21 and also suitably with reference to FIGS. 1, 2, and 4 to 7.

Upon gaining access to a desired disk drive 114, the storage controller 200 is able to issue a predetermined frame for establishing a connection ('open address frame' hereinbelow) and, when, thereafter, a response representing the establishment of a connection is received, the storage controller 200 is able to access the desired disk drive 114.

More specifically, for example, when the storage controller 200 writes data to disk drive (hereinbelow 'SAS target device') 114b, the control program 300 first transmits a request to transmit a frame (frame including a write request and write target data) to the SAS controller ('SAS initiator device' hereinbelow) 214 (S0). The SAS initiator device 214 receives the request and attempts to establish a connection by issuing an open address frame for an SAS target device 114b from the physical phy of an optional phy identifier of the wide port 250 (S1). At this stage, the SAS initiator device 214 designates a phy identifier in accordance with a predetermined rule and is unable to select the phy identifier by means of a method that does not comply with the rules due to the restrictions of the SAS protocol. For example, the rules dictate that, if the phy identifiers are designated in order of how young they are, the SAS initiator device 214 should first issue an open address frame from the physical phy of phy identifier 0 and cannot issue an open address frame from the physical phy of the phy identifier 2 in a state where the physical phys 0, 1 have not established a connection, for example, from the outset by ignoring the rules.

Upon receipt of an open address frame, the SAS expander 130a references the expander route table 196a and checks the path for establishing a connection with the SAS target device 114b (S2). Here, when the SAS expander 130a comprises a plurality of physical phys in the form of a wide port, a young number is selected from among the available physical phys excluding the physical phys that cannot be used as a result of other connection and zone settings.

When, as a result of referencing the direct device route table 195a and the expander route table 196a, and so forth, any one of path not found, no target, and connection not possible due to zone non-registration applies, the SAS expander 130a sends back an OPEN REJECT error to the SAS initiator device 214. Upon receipt of the OPEN REJECT error (S4), the SAS initiator device 214 transmits information contained in the error, for example, an address error of the SAS target device, or a connection establishment not possible due to zone non-allocation to the control program 300 and the control program 300 receives this information (S6). When the establishment of a connection fails due to the zone non-allocation, a Primitive, which signifies the failure of connection establishment due to zone non-allocation is newly defined for the SAS signal called 'Primitive' and, by issuing the Primitive for which the SAS expander has been newly defined, the impossibility of the establishment of a connection due to zone non-allocation can also be identified. When the OPEN_REJECT error is happened due to the zone non-allocation, an OPEN_REJECT error, which signifies the OPEN_REJECT error due to zone non-allocation can be newly defined for the SAS control signal called 'Primitive'. In case of the zone non-allocation, the failure of connection establishment due to zone non-allocation can be categorized an other error cause by transmitting a response to the connection request by way of the defined OPEN_REJECT-Primitive.

The serial processing of this stage is performed when the SAS expander 130a receives an open address frame via the physical phy of the phy identifier 2, for example. This is because the SAS address of the disk drive 114b is not registered in the field corresponding with the phy identifier 2 in the direct device table 195a and the SAS address of the disk drive 114b is not registered in the field corresponding with the phy identifier 2 in the expander route table 196a either.

In S2, when any of path not found, no target, and connection not possible due to zone non-registration applies but all the physical phys constituting a wide port are being used by another connection, the SAS expander 130a sends back OPEN REJECT to the SAS initiator device 214. Upon receipt of the OPEN REJECT error (S5), the SAS initiator device 214 performs S1 once again. The number of retries and the time required for the retries are managed by the SAS initiator device 214 and failure of the retries when a threshold value is reached is reported to the control program.

When, in S2, any of path not found, no target, and connection not possible due to zone non-registration does not apply and there is an available physical phy of a path that has been found, the SAS expander 130a selects the available physical phy, defines the paths of the available physical phy and the physical phy of the SAS expander on the address-frame input side (internal switching of SAS expanders is defined), and transfers the address frame to the downstream SAS expander 130b via the selected available physical phy (S3). As a result, the same S2 processing as for the SAS expander 130a is performed for the SAS expander 130b and, when the SAS target device 114b is found, communications are performed between the SAS expander 130b and SAS target device 114b to establish a connection (S7). The SAS target device 114b issues an OPEN Accept, whereupon the OPEN Accept passes through the connection (path) established between the SAS initiator device 214 and SAS target device 114b before returning to the SAS initiator device 214 (S8). The SAS initiator device 214 responds to receiving the OPEN Accept and transfers the frame corresponding with the frame transmission request received in S1 to the SAS target device 114b (S9). When the frame is received (S10), the SAS target device 114b sends back an ACK. The SAS initiator device 214 receives the ACK (S11) and, when a frame transfer is not required, performs a connection end sequence (S12) to end the connection by releasing the physical phys of all the SAS expanders.

An example of the flow of processing performed when a connection is established was described above. When data is sent from the SAS target device to the SAS initiator device, the SAS target device above outputs a connection request to the SAS initiator device and transfers the frame from the SAS target device to the SAS initiator device. Because the processing sequence is the same as the sequence in FIG. 21 except for the fact that the connection request is implemented by the SAS target device, a description is omitted here.

An example of the flow of processing that is performed by the storage system 100 according to this embodiment will be described hereinbelow.

Figure 8:
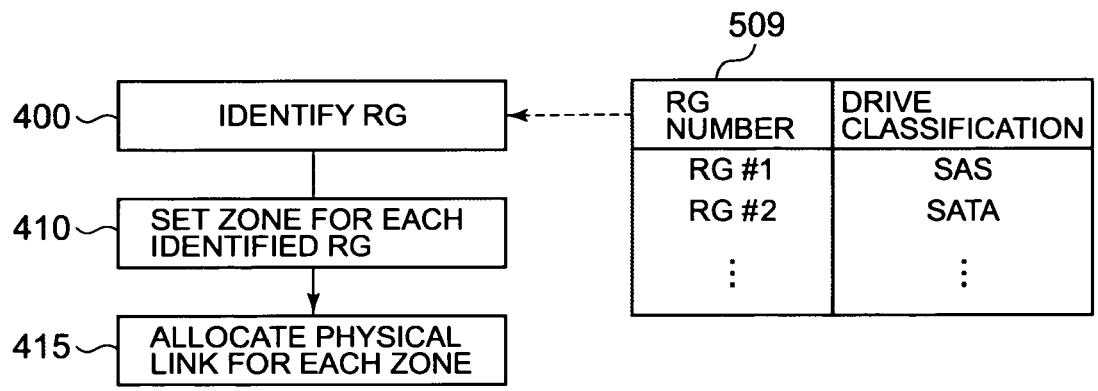
FIG. 8 shows an example of the flow of processing that is performed when the storage system is booted.

FIG. 8 shows an example of the flow of processing that is performed when the storage system is booted. Further, in FIG. 8, 'RG' signifies a RAID group.

The RG/LU setting program 330 acquires information on set RAID groups 140 (step 400). This information can be acquired by a RAID group management table 509, for example. The RAID group management table 509 records, for each RAID group, the numbers representing the RAID groups and the protocol types of the disk drives 114 constituting the RAID groups. Although not illustrated, a variety of other types of information such as numbers representing the disk drives constituting the RAID groups and LUN and so forth of the LU established on the RAID groups may also be recorded for each of the RAID groups.

The zone configuration control program 340 initializes the zone 150 corresponding with all the RAID groups 140 (one zone 150 is set for each RAID group, for example) (step 410) and a physical link is allocated to each zone 150 (step 415).

Further, when, during booting, an instruction to divide the physical links used according to the protocol classification is issued beforehand by the management 104, in step 415, the zone configuration control program 340 divides the zone 150 according to the protocol classification so that there is no overlap. In the example in FIG. 1, zone 150 is established so that zone 150a includes physical links 108a and 108b that constitute the wide link 120a and zone 150b includes the physical link 108c constituting the wide link 120a and there is no mutual sharing of the physical links 108 by the zones. The number of physical links constituting the wide link 120 can be calculated by using various conditions, and statistical information such as the drive types constituting the RAID groups 140, the performance of the drives, the number of drives, and the I/O request performance of the RAID group 140 monitored by the performance monitoring program 350, for example.

Figure 9:
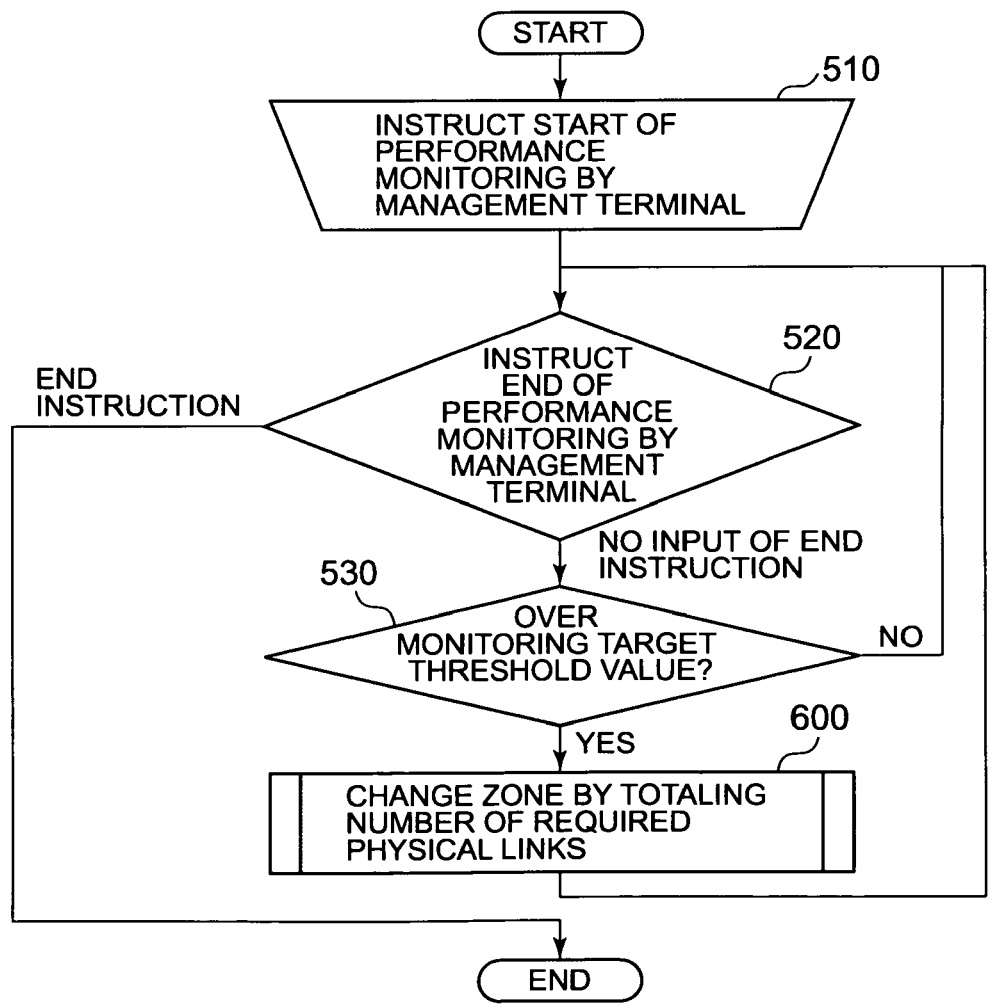
FIG. 9 shows an example of the flow of processing for changing the number of physical links 108 allocated to a zone 150.

FIG. 9 shows an example of the flow of processing for changing the number of physical links 108 allocated to zone 150.

The performance monitoring program 350 starts the execution in accordance with an instruction from the management terminal 104. When an instruction for performance monitoring arrives, the performance monitoring program 350 starts to execute the acquisition of statistical information on performance for each of the RAID groups 140 and moves to step 520. When an instruction does not arrive, the performance monitoring program 350 waits for an instruction as is in step 510. Further, 'performance' as it is meant here is the data size transferred for each unit of time.

In step S520, if an instruction to end performance monitoring arrives from the management terminal 104, the performance monitoring program 350 ends the execution and ends the flow. When there is no end instruction, the processing moves to step 530.

In step 530, when, based on the statistical information on performance, the performance threshold value of a certain RAID group 140 being monitored is exceeded, the processing moves to step 600 and, when step 600 is complete, the processing returns to step 520. The performance threshold value used in step 530 is a value that is decided on the basis of the number of physical links 108 included in zone 150, for example.

Figure 10:
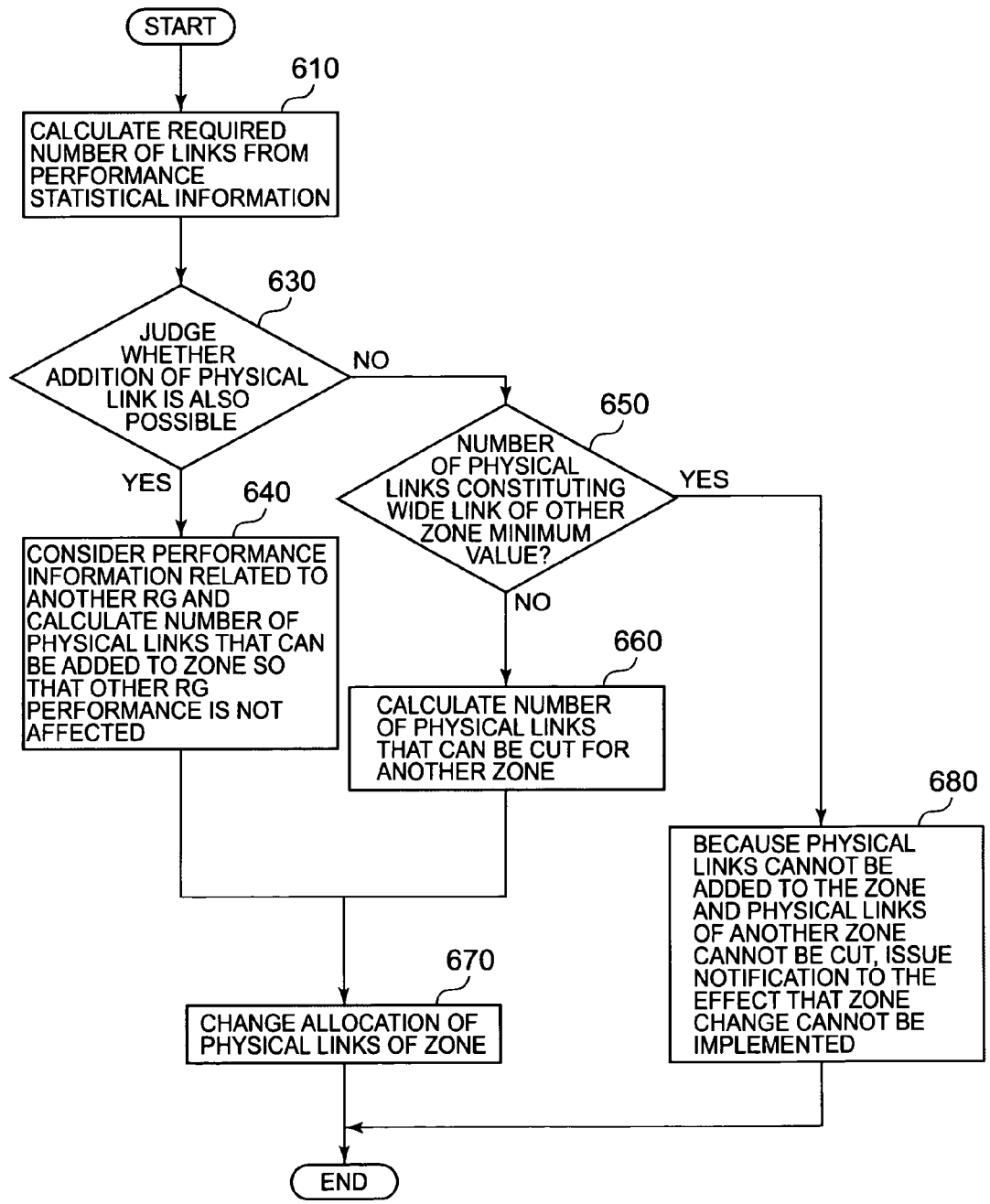
FIG. 10 shows an example of the flow of processing that is performed in step 600 of FIG. 9.

FIG. 10 shows an example of the flow of processing that is performed in step 600 in FIG. 9.

In step 610, the performance monitoring program 350 calculates the required number of physical links 108 on the basis of the statistical information on performance. Specifically, the number of physical links 108 in a number suited to the performance at which the performance threshold value is exceeded or a number suited to the maximum performance hereafter that is estimated from the statistical information on performance is calculated.

In step 630, the zone configuration control program 340 judges whether further physical links 108 can be added to the zone 150 to be changed. When further physical links can be added, the processing moves to step 640 and, when no further physical links can be added, the processing moves to step 650. Here, a case where further physical links can be added is, for example, a case where a physical link that is not allocated to any zone (or a physical link that has already been allocated to a zone and may not be allocated further to the other zone) exists and a case where physical links cannot be added is a case where physical links that have not been allocated to a zone (or physical links that have been allocated to a zone and have not been added to the other zone) do not exist.

In step 640, the zone configuration control program 340 considers performance information related to other RAID groups 140 (or disk drives 114) when the wide link 120 of the zone to be changed is shared with another zone 150 (when one wide link 120a is shared with two zones 150a and 150b as exemplified by FIG. 1, for example) and calculates the number of physical links 108 that can be added to the wide link 120 of the zone 150 to be changed so that there is no adverse effect on the performance of the other RAID groups 140 (or disk drives 114).

In step 650, the zone configuration control program 340 judges whether the other zone 150 is sharing a physical link 108 with zone 150 to which a physical link 108 is to be allocated. When such sharing exists, the zone configuration control program 340 checks whether the number of physical links 108 of the other zone 150 is a minimum value (other zone 150 comprises only one physical link 108). When the number of physical links 108 that the other zone 150 comprises is not the minimum value, the zone configuration control program 340 moves to step 660 because a margin exists for reducing the number of physical links 108 of the other zone 150. When the number of physical links 108 that the other zone 150 comprises is the minimum value, it is not possible to change all the zones 150 and the processing moves to step 680.

In step 660, the zone configuration control program 340 calculates the number of physical links that can be reduced in the other zone 150 and proceeds with step 670.

In step 670, the zone configuration control program 340 changes the number of physical links 108 in zone 150.

A case where physical links are added to zone 150 in step 670 will be described by way of example. For example, in FIG. 1, if, when a physical link 108a is not allocated to a RAID group 140 (set of disk drives 114b and 114c), the physical link 108a is allocated to the RAID group 140, the zone configuration control program 340 issues a physical link addition instruction to the SAS expander 130a. The physical link addition instruction contains phy identifier 0 of the SAS expander 130a and the addresses of the devices to be allocated (respective SAS addresses of the disk drives 114b and 114c). A zone setting program 190a records the addresses of the device to be allocated (the SAS addresses of the disk drives 114b and 114c) in fields of fields 430 that correspond with the phy identifier 0 of the direct device table 195a in accordance with the physical link addition instruction. In addition, the zone setting program 190a records the respective SAS addresses of the disk drives 114b and 114c in the fields corresponding with the phy identifier 0 of the expander route table 196a.

A case where allocated physical links are eliminated from zone 150 in step 670 will now be described by way of example. For example, if the allocation of physical link 108a is released when the physical link 108a in FIG. 1 has been allocated to the RAID group 140 (set of disk drives 114b and 114c), the zone configuration control program 340 issues a physical link elimination instruction to the SAS expander 130a. The physical link elimination instruction contains the phy identifier 0 of the SAS expander 130a and the addresses of the devices to be allocated (the respective SAS addresses of the disk drives 114b and 114c). The zone setting program 190a eliminates the respective SAS addresses of the disk drives 114b and 114c from the fields of fields 430 that correspond with phy identifier 0 of the direct device table 195*a* in accordance with the physical link elimination instruction and records NULL in these fields. In addition, the zone setting program 190*a* eliminates the addresses of the devices for which allocation is to be released from the fields corresponding with phy identifier 0 of the expander route table 196*a* (the respective SAS addresses of the disk drives 114*b* and 114*c*) to establish non-registration.

As detailed earlier, the processing to allocate a physical link and to release the allocation thereof involves the addition of information on the devices (SAS targets) targeted for the allocation of the physical link to at least one of the direct device table 195 and expander route table 196 in the SAS expander 130 comprising the physical link to be allocated or whose allocation is to be released or the elimination of information on the devices whose physical link allocation is to be released. The control program 300 grasps the respective SAS expanders 130 that exist downstream of the storage controller 200 and the phy identifiers of each SAS expander 130 (holds the SAS addresses of all the SAS expanders 130 and the phy identifiers of the respective SAS expanders 130, and so forth, for example). The control program 300 is able to designate phy identifiers for the physical phys to which the physical links are connected and SAS addresses that are newly associated with the phy identifiers or eliminated from the phy identifiers, for the SAS expanders 130 having the physical links to be allocated or whose allocation is to be released. When all the SAS addresses are eliminated, a designation to that effect may be made instead of the SAS addresses.

Further, in step 680, the zone configuration control program 340 issues a report to the management terminal 104 to the effect that the zone 150 cannot be changed because physical links 108 cannot be changed for the zone 150 whose performance is judged to be required and for any kind of zone 150 that is shared with zone 150.

FIG. 11 shows a constitutional example of the zone state management table 700. Further, in FIG. 11, 'RG' represents a RAID group, 'WL' represents a wide link, and 'phy' represents a physical phy.

The zone state management table 700 is a table for holding the control program 300, for example, and contains the following information. Each of the information items therein will now be described.

The RG number 710 is an identification number of the RAID group 140. The drive classification 720 is the classification of the drives constituting the RAID group 140 (may contain various information such as the protocol classification and whether there is a performance difference between the drives, for example). The LU number 730 is a list of the numbers of logical units for storing data corresponding with the RG number 710. The zone number 740 is an identification number of the zone 150 that corresponds with the RAID group 140. The performance statistical information 750 holds statistical information on the performance that is acquired by the performance monitoring program 350. The performance threshold value 760 is a value (threshold value) that is the product of a calculation based on information 790 on overlapping zones 150. When an I/O request exceeding this value arrives from the host, the threshold value is exceeded in step 530 in FIG. 9 and the flow 600 for changing the zone 150 is executed. The phy identifier 770 constituting the WL stores the phy identifier of the SAS expander 130 constituting the wide link 120. Wide link part fault production 780 is a list that registers the particular physical link 108 in which a fault occurs when a fault occurs in a portion of the physical links 108 constituting the wide link 120. 'Unregistered' is registered when a normal state prevails or the physical link 108 has recovered from a fault.

The control program 300 is able to provide the management terminal 104 with the table 700 in response to a request from the storage system management program 105 of the management terminal 104, for example. The storage system management program 105 is able to display information represented by the table 700 on the display device of the management terminal 104.

Further, several examples of cases where a change is made to the allocation of physical links in the present embodiment will be described hereinbelow. Further, as can be seen from the above description, a plurality of physical links constituting one wide link can be distributed among a plurality of zones but one or more physical links in one wide link in one zone is called a 'Sub Wide Link' hereinbelow.

Figure 12A:
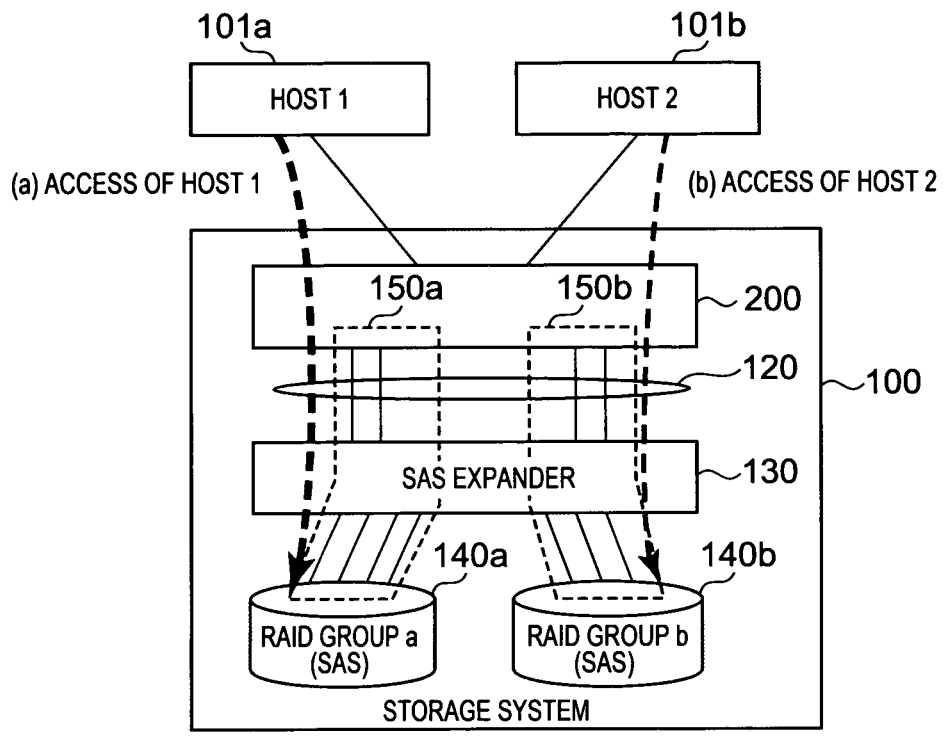
FIG. 12A shows the allocation of physical links prior to changing the allocation in a first case where the allocation of the physical links is changed.
Figure 12B:
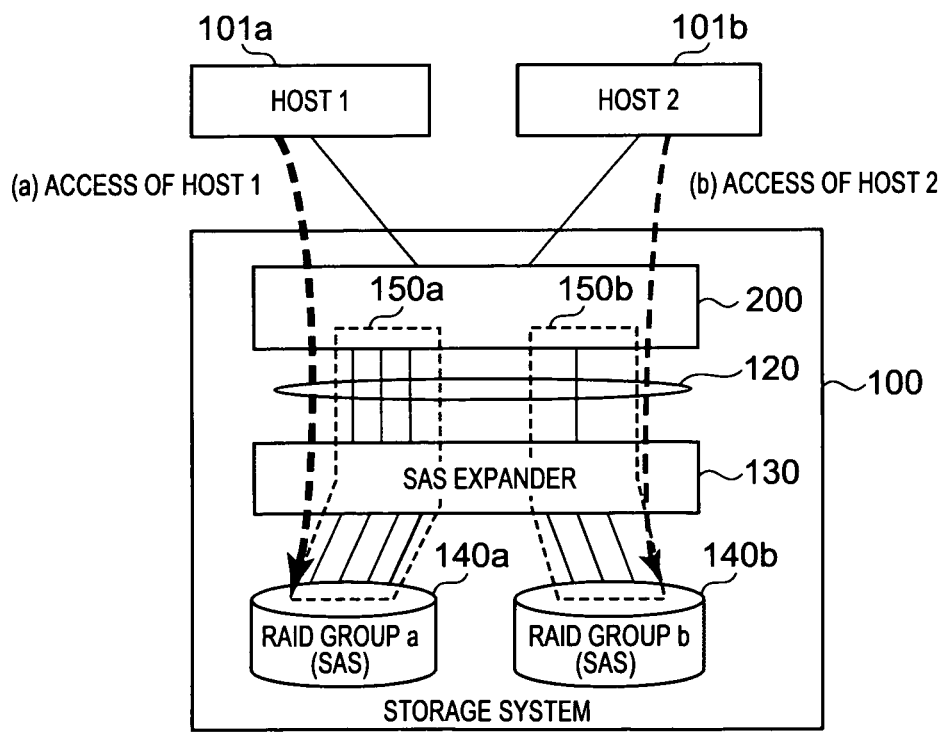
FIG. 12B shows the allocation of physical links after changing the allocation.

FIG. 12A shows the allocation of physical links prior to changing the allocation in a first case where the allocation of physical links is changed and FIG. 12B shows the allocation of physical links after the allocation has been changed.

Suppose that, prior to changing the allocation of physical links, one zone 150 is allocated to one RAID group 140, as exemplified by FIG. 12A (150*a* is allocated to 140*a* and 150*b* is allocated to 140*b*, for example). Further, the classifications of drives constituting the RAID groups 140*a* and 140*b* respectively are different (suppose, for example, that 140*a* is a set of SAS drives and 140*b* is a set of SATA drives). Suppose that one wide link 120 is constituted by four physical links. Further, there are two physical links in the Sub Wide Link of zone 150*a* and two physical links in the Sub Wide Link of zone 150*b*.

In this case, suppose that the performance monitoring program 350 judges that an I/O request from the host computer 101*a* requires a sustain performance in comparison with an I/O request from the host computer 101*b*. In this case, the performance monitoring program 350 judges that a large number of physical links 108 constituting the wide link 120 must be established for zone 150*a*.

Therefore, as shown in FIG. 12B, the zone configuration control program 340 reduces the physical links in the Sub Wide Link of the zone 150*b* by one and one physical link is added to the Sub Wide Link of zone 150*a*. Here, the zone configuration control program 340 changes the allocation of physical links so that there is no overlap between zone 150*a* and zone 150*b*. This is because it is judged, in view of the difference in drive classification between RAID group 140*a* and RAID group 140*b*, that zone 150*a* and zone 150*b* are overlapping.

As a result, the control program 300 is able to allocate a plurality of physical links constituting the wide link 120 to a drive or RAID group. The number of physical links allocated makes it possible to implement bandwidth assurance within the storage system by monitoring increases in the request performance (in other words, the load) of I/O requests from the host and controlling the allocation of physical links. Further, the effect on the throughput performance produced by differences in the drive classifications can be alleviated.

Figure 14:
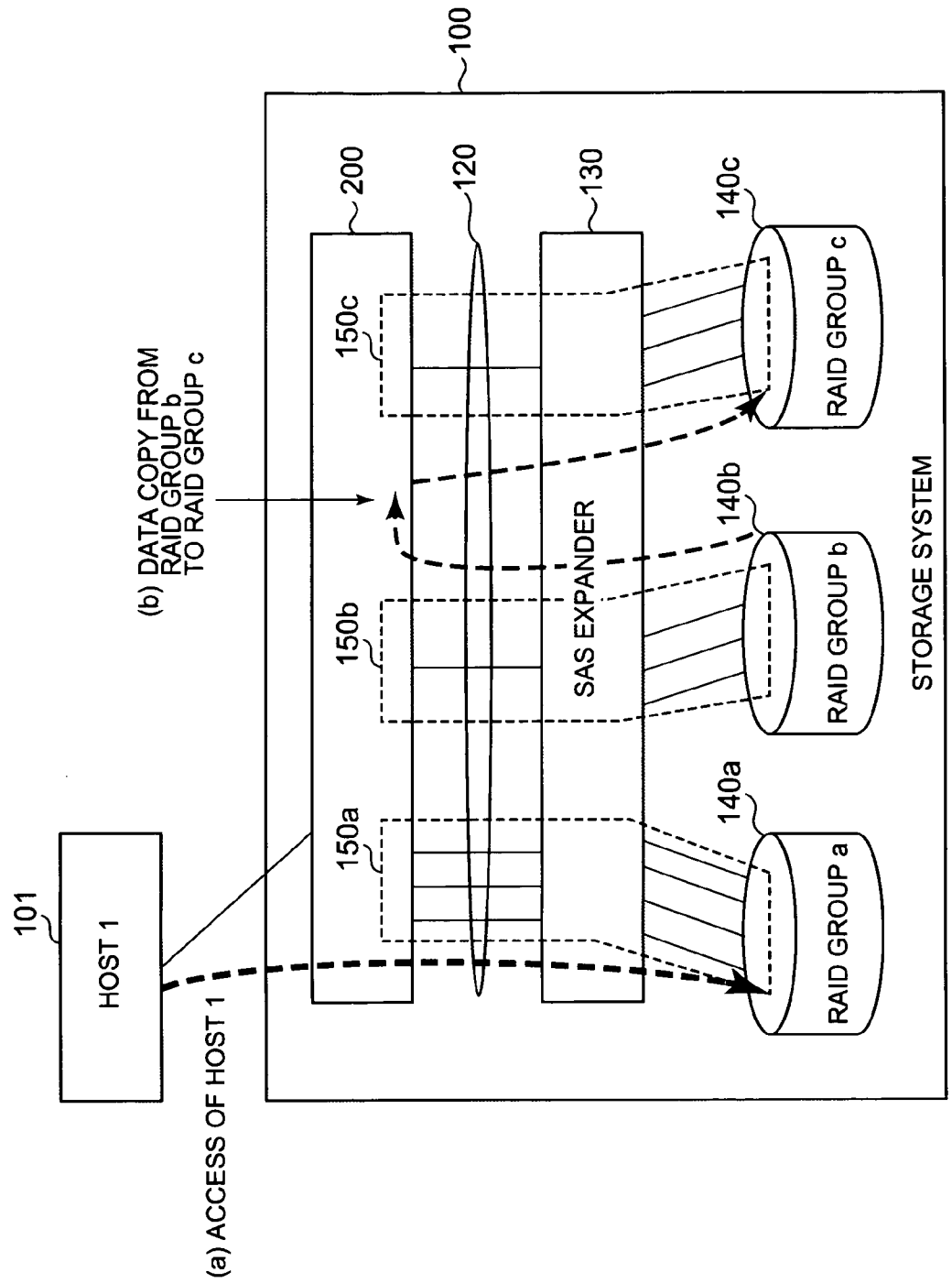
FIG. 14 shows the allocation of physical links after changing the allocation.

FIG. 13 shows the allocation of physical links prior to changing the allocation in a second case where changes to the allocation of physical links are made. FIG. 14 shows the allocation of physical links after the allocation has been changed.

Suppose that, prior to changing the allocation of physical links, one zone 150 is allocated to one RAID group 140 as exemplified by FIG. 13. Suppose that one wide link 120 is constituted by five physical links. Further, suppose that there is one physical link in the Sub Wide Link of zone 150*a*, two physical links in the Sub Wide Link of zone 150*b* and two physical links in the Sub Wide Link of zone 150*c*. Suppose that data is copied from RAID group 140*b* to RAID group 140*c* by means of the background control program 360 (that is, suppose that processing to read data from the RAID group 140*b* and write the data thus read to the RAID group 140*c* is performed).

In this case, suppose that the performance monitoring program 350 judges that there has been an I/O request for the RAID group 140*a* from the host computer 101 as shown in FIG. 14 (or the request performance of the I/O requests exceeds the predetermined threshold value).

Therefore, as shown in FIG. 14, the zone configuration control program 340 reduces the physical links in the Sub Wide Link of zone 150*b* by one and reduces the physical links in the Sub Wide Link of zone 150*c* by one and adds the same number of physical links to the Sub Wide Link of zone 150*a*.

As a result, bandwidth assurance to satisfy the performance of the I/O requests from a host as far as possible can be implemented in the storage system. Further, although the number of physical links from both the Sub Wide Links of zones 150*b* and 150*c* is reduced, if performance of the same level as that of the I/O request from the host computer 101 is also required by the internal I/O, the physical links need not be taken from both Sub Wide Links. As mentioned earlier, the number of physical links taken away or added can be a suitable value according to the performance required by the I/O or the drive classification.

Figure 15A:
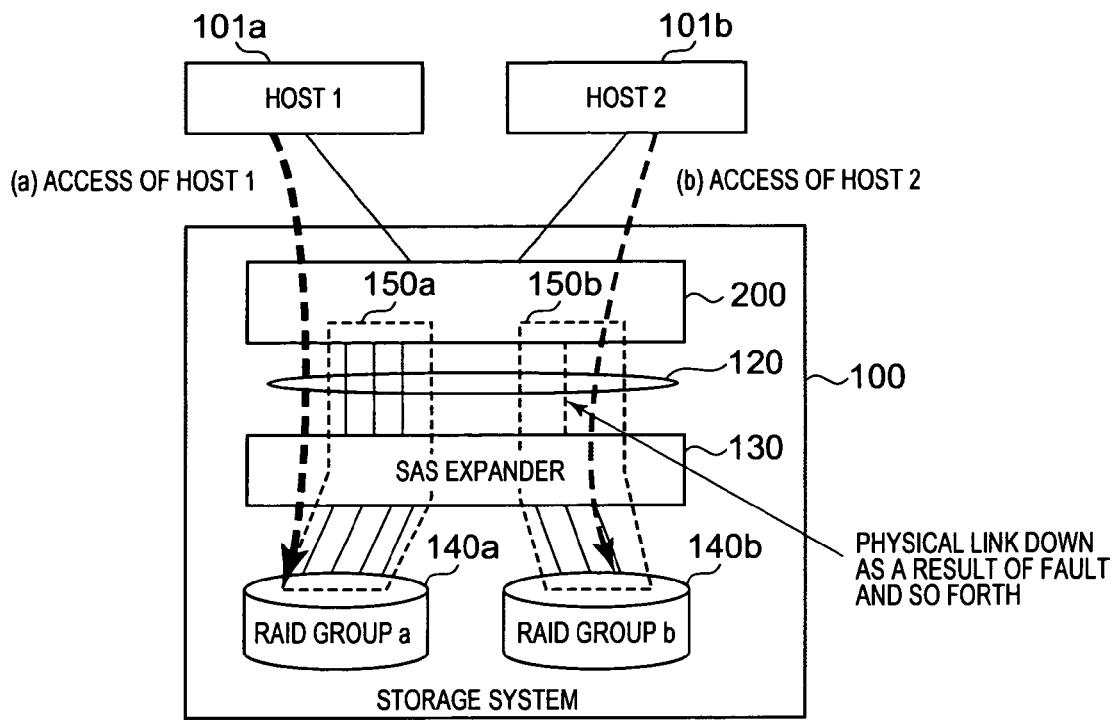
FIG. 15A shows the allocation of physical links prior to changing the allocation in a third case where the allocation of the physical links is changed.
Figure 15B:
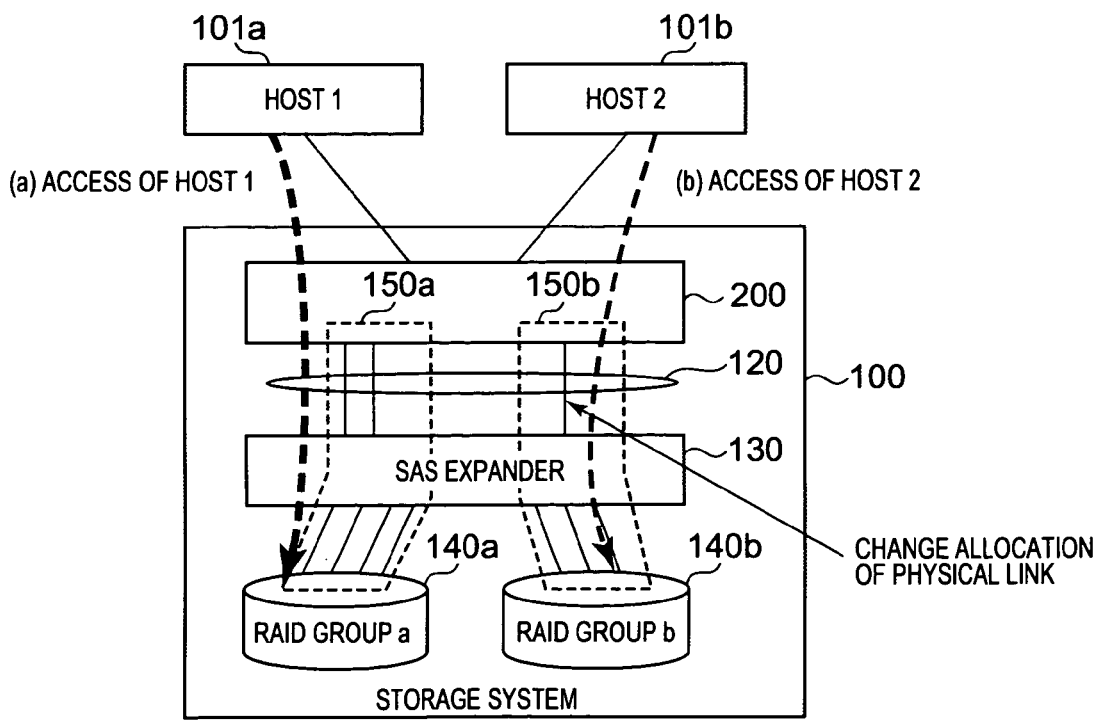
FIG. 15B shows the allocation of physical links after changing the allocation.

FIG. 15A shows the allocation of physical links prior to changing the allocation in a third case in which a change to the allocation of physical links is performed and FIG. 15B shows the allocation of physical links after changing the allocation.

Suppose that, prior to changing the allocation of physical links, one zone 150 is allocated to one RAID group 140 as exemplified by FIG. 15A. Suppose that one wide link 120 is constituted by four physical links. Further, suppose that there are three physical links in the Sub Wide Link of zone 150*a* and one physical link in the Sub Wide Link of zone 150*b*. As a result, the I/O request for the RAID group 140*a* from the host computer 101*a* and the I/O request for the RAID group 140*b* from the host computer 101*b* can be processed.

In this case, suppose that the fault processing program 370 detects the occurrence of a fault in the physical link constituting the Sub Wide Link of zone 150*b*. Access cannot be made to the RAID group 140*b* by the storage controller 200 without further processing and, consequently, an I/O request from the host computer 101*b* cannot be processed.

Therefore, the zone configuration control program 340 makes changes to the allocation of physical links so that the Sub Wide Link of the zone 150*b* returns to the same state as prior to the occurrence of the fault. More specifically, the zone configuration control program 340 reduces the physical links in the Sub Wide Link of zone 150*a* by one and adds one physical link to the Sub Wide Link of zone 150*b*, as shown in FIG. 15B.

As a result, even when a fault occurs in a physical link constituting the wide link, an access path to the disk drive or RAID group can be maintained by correcting the allocation of the number of physical links.

Further, the following may be performed in the above embodiment.

Figure 16:
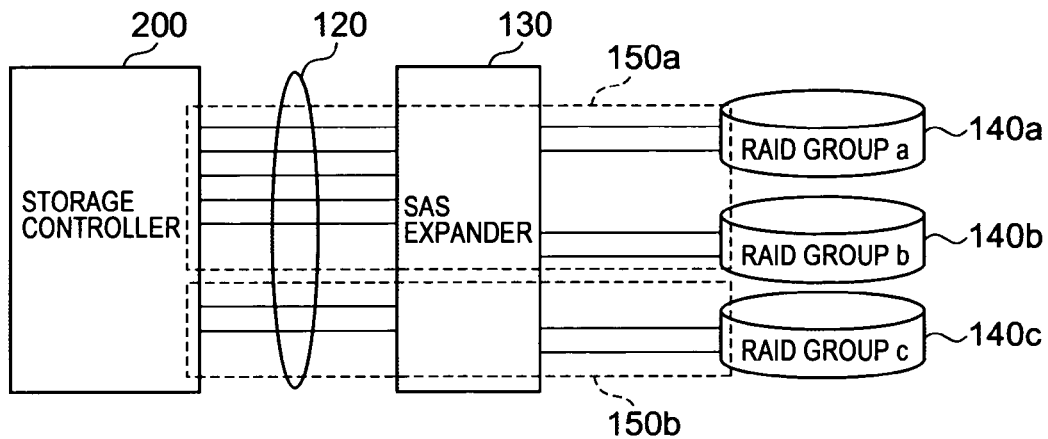
FIG. 16 is an explanatory diagram of a first modified example of the first embodiment of the present invention.

For example, as exemplified by FIG. 16, a plurality of RAID groups 140*a* and 140*b* may be associated with one zone 150*a*. In this case, the storage controller 200 may change the allocation, within the range of the Sub Wide Link of another zone 150*a*, of the number of physical links for the RAID group 140*a* and the number of physical links for the RAID group 140*b* in the wide link 120 and add physical links in the Sub Wide Link of the other zone 150*b* to the Sub Wide Link of the zone 150*a*. Further, the number of physical links allocated to the RAID group 140*a* can be adjusted within a range such that there is no adverse effect on the other RAID group 140*b* that belongs to the zone 150*a* when the allocation is changed within the range of the Sub Wide Links of zone 150*a*. As the lower limit for a range that does not produce an adverse effect, for example, a number that must satisfy the request performance for the RAID group 140*b* can be adopted as the lower limit.

Figure 17:
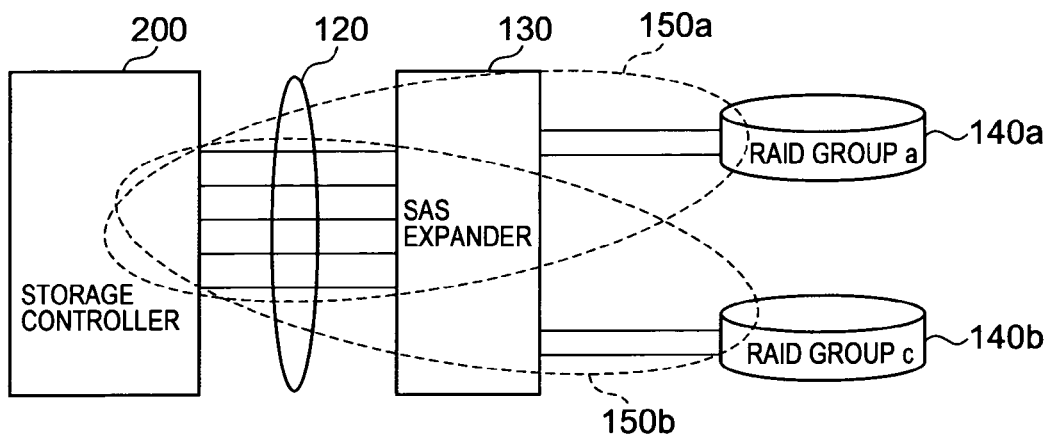
FIG. 17 is an explanatory diagram of a second modified example of the first embodiment of the present invention.

Furthermore, as probably mentioned earlier, a plurality of zones 150*a* and 150*b* may be overlapped in the wide link 120 as exemplified by FIG. 17. That is, according to the example in FIG. 17, the storage controller 200 makes it possible to access the RAID group 140*a* and the other RAID group 140*b* from the wide link 120.

Figure 18:
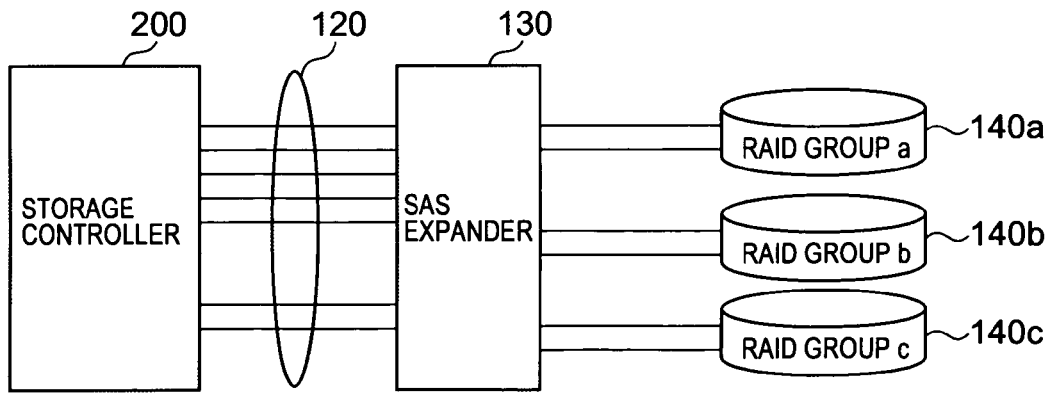
FIG. 18 is an explanatory diagram of a third modified example of the first embodiment of the present invention.

Further, as exemplified by FIG. 18, the zone concept may be dispensed with. According to the example in FIG. 18, the allocation of a particular physical link among the plurality of physical links in the wide link 120 to a particular RAID group 140 (or disk drive) is controlled.

Figure 19:
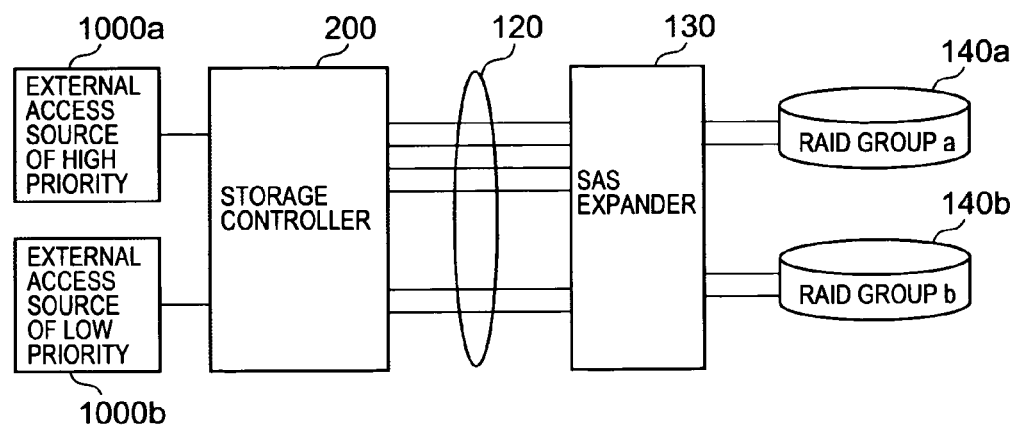
FIG. 19 is an explanatory diagram of a fourth modified example of the first embodiment of the present invention.

Moreover, as exemplified by FIG. 19, a priority is set for access sources 1000*a* and 1000*b* outside the storage system 100 and the number of physical links allocated to a RAID group (or disk drive) may be determined on the basis of the priority level of the external access source of the access destination RAID group (or disk drive). More specifically, when there are two types of priority which are high and low, for example, the storage controller 200 is able to allocate two times the number of physical links in comparison with the access destination RAID group 140*b* from the external access source 1000*b* of low priority to the access destination RAID group 140*a* from the external access source 1000*a* of high priority in the wide link 120 (four physical links can be allocated to 140*a* and two physical links can be allocated to 140*b*, for example). Further, in this modified example, the external access source is the host computer 101 or an application program in the host computer 101 (a computer program running on the operating system). The storage controller 200 is able to store information representing the priority level of the external access source in the memory for each external access source. The storage controller 200 specifies the external access source upon establishing a connection with the external access source or upon receiving an I/O request, for example, and, by detecting the priority level corresponding with the specified external access source from the memory, is able to execute a change to the number of physical links allocated to the access destination of the external access source thus specified.

Figure 20:
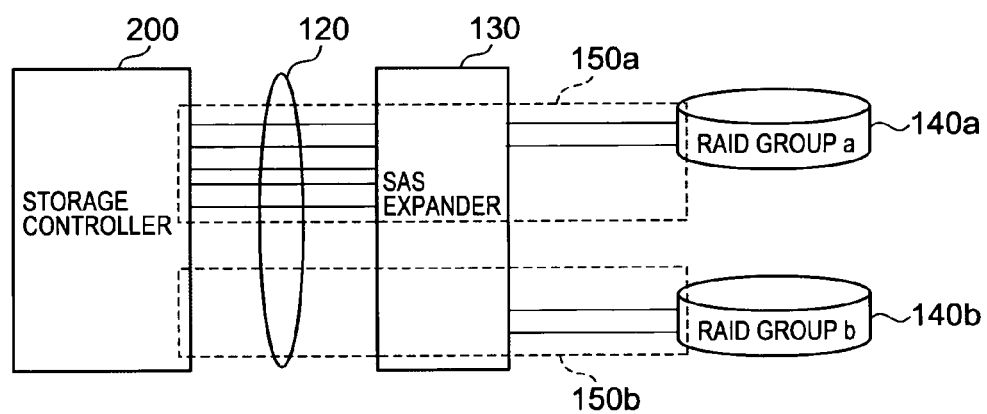
FIG. 20 is an explanatory diagram of a fifth modified example of the first embodiment of the present invention.

Furthermore, as exemplified by FIG. 20, the storage controller 200 may make the number of physical links allocated to the RAID group 140*b* (or disk drive) in the wide link 120 zero. In so doing, it is possible to ensure that, although the RAID group 140*b* (or disk drive) cannot be accessed by the storage controller 200, data in the RAID group 140*b* can be updated and data cannot be read from the RAID group 140*a*. That is, when a high security level is required of the RAID group 140*b*, data in the RAID group 140*b* can be protected by making the number of physical links zero as mentioned above. Further, although the allocation of physical links connecting the RAID group 140*b* and SAS expander 130 may be released instead of this method, it is considered desirable to establish zero physical links in the wide link 120 and that the number of physical links that can be allocated to the other RAID groups (or disk drives) should increase to the same extent as mentioned earlier. Further, although this is said to be the security level of the RAID group in the above description, this may be the security level of the disk drives constituting the RAID group or of the LU.

Preferred embodiments of the present invention as well as a few modified examples thereof were described hereinabove but these are examples serving to illustrate the present invention. There is no intention to limit the scope of the present invention to these embodiments and modified examples. The present invention can also be implemented by a variety of other embodiments.

For example, the above storage system can also be applied to a server system. Here, it can be assumed that the storage controller 200 is a server machine (a so-called blade server, for example), for example.

Furthermore, for example, a plurality of disk drives can be installed in an enclosure and the performance monitoring program 350 may monitor the resources at fixed intervals by issuing a resource monitoring command for monitoring the resources of the enclosure (disk drives, for example) at fixed intervals to a predetermined destination at fixed intervals. Here, a zone dedicated to resource monitoring commands may be provided. As a result, physical links that are used when processing I/O requests for disk drives and physical links that are used in the issuing of resource monitoring commands can be separated, whereby resource monitoring can be performed so that there is no effect on I/O requests from host computers.

Further, although the premise is that the computer system (storage system, for example) of the embodiment of the present invention uses an SAS I/F, for example, the embodiment of the present invention can also be applied to future I/Fs with a function that is equivalent to an SAS wide link.

Moreover, for example, in the above description, the allocation-controlled 'physical links' may be 'logical links'. Logical links can be managed by means of a direct device table and expander route table and so forth as per the abovementioned physical links. Logical links are links formed by time-dividing one physical link. More specifically, in the case of a transfer of a connection in which a low transfer rate (1.5 Gbps, for example) and a high transfer rate (3 Gbps, for example), for example, are mixed, a high-speed physical link (3 Gbps, for example) is time-divided to establish the transfer state at a certain time and establish a no transfer state at another time at which a transfer was originally possible. More specifically, as exemplified by FIG. 22, for example, an increase in the transfer speed of the whole system can be implemented simultaneously establishing a plurality of low-speed connections at the same time by means of an environment in which a multiplicity of disk drives are connected at low speed by time-dividing a physical link into two or four and bundling a plurality of logical links of a low transfer rate to form one physical link. The abovementioned zoning control (control of the allocation of logical links to the respective zones) can be established by making a logical phy table of indexes indicating the physical phys (phy) of the direct device table and expander route table 196 for each logical link.

What is claimed is:

1. A computer system, comprising: a plurality of Serial Attached SCSI (SAS) target devices constituting targets that follow the SAS protocol;
a SAS initiator device, constituting an SAS initiator that follows the SAS protocol, that is connected to a host computer accessing data stored in the plurality of SAS target devices; and a plurality of SAS expander devices, comprising at least a first SAS expander device and a second SAS expander device, each SAS expander device being connected to at least one SAS target device by a respective physical link which is physical wiring,
wherein said first SAS expander device is directly connected to the SAS initiator device by a first wide link constituted by a first plurality of physical links and said first SAS expander device is directly connected to the second SAS expander device by a second wide link, constituted by a second plurality of physical links, via a wide port constituting a plurality of physical ports each corresponding to a respective physical link,
wherein the SAS initiator device is operative to selectively establish connections between the host computer and the plurality of SAS target devices via the physical links in the first wide link and the second wide link, said SAS initiator device having a physical-link allocation control section operative to allocate a certain physical link from among the first plurality of physical links constituting the first wide link and to allocate a certain physical link from among the second plurality of physical links constituting the second wide link,
wherein each of the first and second SAS expander devices has a direct device table and a route table wherein the direct device table includes identifiers corresponding to the plurality of physical ports related to the SAS address corresponding to the wide port, SAS addresses of the target devices directly attached to the physical ports, SAS addresses of the target devices that permit transmission of a connection request, on a physical port basis, and information related to upstream and downstream wide links for the respective SAS expander device,
wherein the route table includes identifiers corresponding to the plurality of physical ports and SAS addresses of the target devices indirectly connected at a downstream side of the respective SAS expander device to an SAS target device,
wherein the SAS initiator device is operative to send open address frames to one of the SAS target devices to establish a connection for accessing data stored in the SAS target device according to the SAS protocol and the open address frames is sent by indicating the SAS address of the wide port of the first SAS expander device,
wherein the first SAS expander device receives the open address frames including the SAS address of the SAS target device, checks paths from the SAS initiator device to the SAS target device for establishing the connection by referring the direct device table and the route table stored in the first SAS expander device, selects an available physical port of an upstream side of the first SAS expander device and an available physical port of a downstream side of the first SAS expander device from the plurality of physical ports corresponding to the wide port of the first SAS expander device, defines at least one path including the available physical port of the first SAS expander device and the physical port of the second SAS expander device on an upstream side, and transfers an address frame including the SAS address of the SAS target device by indicating the SAS address of the wide port of the second SAS expander device to the second SAS expander device via the selected available physical port,
wherein the second SAS expander device receives the address frame, checks paths from the second SAS expander device to the SAS target device for establishing the connection by referring the direct device table stored in the second SAS expander device, selects an available physical port of a downstream side of the second SAS expander device from the plurality of physical ports connected to the SAS target device, and defines at least one path from the second SAS expander device to the SAS target device, and wherein the physical-link allocation control section selectively controls a number of physical links allocated to a particular target device for at least one wide link among the first wide link between the SAS initiator device and the first SAS expander device and the second wide link, between the first SAS expander device and the second SAS expander device, the selective control being based upon a specified performance of the SAS target devices related to the wide link, and updates the direct device table and the route table on the basis of the allocation.

2. The computer system according to claim 1, further comprising:

a monitoring section that monitors, with respect to each SAS target device, the I/O request performance which is the I/O performance requested for the SAS target device, wherein the physical link allocation control section controls the number of physical links allocated to each SAS target device on the basis of the I/O request performance for each SAS target device.

3. The computer system according to claim 2, wherein the physical link allocation control section allocates a larger number of physical links to an SAS target device with a high I/O request performance than to an SAS target device with a lower I/O request performance.

4. The computer system according to claim 2, wherein the SAS initiator device receives an I/O request from host computer, performs a first I/O with respect to a first SAS target device corresponding with the I/O request, and performs a second I/O with respect to a second SAS target device by means of a backend irrespective of the I/O request from the host computer; and the physical link allocation control section controls the number of physical links allocated to the first SAS target device and the number of physical links allocated to the second SAS target device on the basis of the I/O request performance of the first I/O and the I/O request performance of the second I/O respectively.

5. The computer system according to claim 4, wherein the physical link allocation control section allocates a larger number of physical links to the first SAS target device than to the second SAS target device when the I/O request performance of the first I/O is higher than the I/O request performance of the second I/O.

6. The computer system according to claim 1, wherein SAS target devices of different communication protocols are mixed in the plurality of SAS target devices, and the physical link allocation control section controls the number of physical links allocated to each SAS target device on the basis of the type of communication protocol of the SAS target device.

7. The computer system according to claim 6, wherein the physical link allocation control section allocates a larger number of physical links to an SAS target device that communicates by means of a communication protocol of a poor transfer efficiency than to an SAS target device that communicates by means of a communication protocol of a good transfer efficiency.

8. The computer system according to claim 6, wherein the physical link allocation control section allocates a larger number of physical links to an SAS target device that communicates by means of a communication protocol of a good transfer efficiency than to an SAS target device that communicates by means of a communication protocol of a poor transfer efficiency.

9. The computer system according to claim 1, wherein each SAS target device is a storage device, and two or more storage devices constitute a RAID group as a result of grouping in accordance with RAID rules, and the physical link allocation control section controls the number of allocated physical links in RAID group units.

10. The computer system according to claim 1, further comprising:

a zone setting section that performs zone setting in which an access path from the SAS initiator device to the plurality of SAS target devices is divided into a plurality of logical zones, wherein the physical link allocation control section controls the number of physical links allocated to each SAS target device on the basis of the set plurality of logical zones.

11. The computer system according to claim 10, wherein, when a plurality of SAS target devices belong to one zone, the physical link allocation control section controls the number of physical links allocated to each of the plurality of SAS target devices within the range of this one zone.

12. The computer system according to claim 10, further comprising:

a resource monitoring section that issues at fixed intervals a resource monitoring command for monitoring the resource of an enclosure connecting the plurality of SAS target devices at fixed intervals, wherein the zone setting section sets an I/O dedicated zone that is used for I/Os with respect to the SAS target devices and that is not used to issue the resource monitoring command, and a resource monitoring dedicated zone that is used to issue the resource monitoring command and that is not used for I/Os.

13. The computer system according to claim 1, wherein the SAS initiator device is operative to receive an I/O request from a plurality of host computers and performs an I/O with respect to the SAS target device corresponding with the I/O request; and the physical link allocation control section allocates, based on respective priority levels of the plurality of host computers, a larger number of physical links to an SAS target device corresponding with an I/O request from a host computer of higher priority than to an SAS target device corresponding with an I/O request from a host computer of a lower priority.

14. The computer system according to claim 1, wherein the physical link allocation control section prevents an I/O with respect to a certain SAS target device by making the number of physical links allocated to the certain SAS target device zero or releasing the allocation of physical links connecting the certain SAS target device and the service delivery subsystem, in at least one wide link among the wide link between the first SAS expander device and the SAS initiator device and the wide link between the first SAS expander device and the second SAS expander device.

15. The computer system according to claim 1, wherein each of the one or plurality of SAS expander devices comprises a plurality of communication ports respectively connected to a plurality of physical links, and a storage area that stores switch control information;

the switch control information records, for each of the plurality of communication ports, direct device data representing devices that are directly attached without the interposition of another communication port and indirect device data representing SAS target devices that are connected indirectly via another communication port;

when the direct device data for the communication ports is are data representing SAS target devices, the SAS target device is an SAS target device to which physical links connected to the communication ports are allocated;

the indirect device data for the communication ports is are data representing SAS target devices to which physical links connected to the communication ports are allocated; and the physical link allocation control section controls the physical links allocated to the SAS target devices by updating the switch control information for at least one switch device of the one or plurality of switch devices.

16. The computer system according to claim 15, wherein, if each of the one or plurality of switches receives a connection request for establishing a connection with a certain SAS target device via a physical link that is not allocated to the certain SAS target device, an error is sent back to the source that issued the connection request via the physical link so that a connection is not established via the physical link.

17. The computer system according to claim 1, wherein a management terminal for managing the computer system is communicably connected to the computer system; and the physical link allocation control section controls how many physical links are allocated to a particular SAS target device in accordance with an instruction from the management terminal.

18. The computer system according to claim 1, wherein the computer system is a storage system comprising a plurality of storage devices;

the plurality of SAS target devices is the plurality of storage devices;

the SAS initiator device is a controller for controlling I/Os with respect to the respective storage devices;

the plurality of SAS expander devices comprise a plurality of switch devices;

each of the plurality of switch devices comprises a plurality of communication ports respectively connected to a plurality of physical links and a storage area for storing switch control information;

the switch control information records, for each of the plurality of communication ports, direct device data representing devices that are directly attached without the interposition of another communication port and indirect device data representing storage devices that are connected indirectly via another communication port;

when the direct device data for the communication ports is are data representing storage devices, the storage devices are storage devices to which physical links connected to the communication ports are allocated;

the indirect device data for the communication ports is are data representing storage devices to which physical links connected to the communication ports are allocated;

the storage system further comprises a monitoring section for monitoring, for each of the storage devices, the I/O request performance which is the I/O performance requested for the storage device; and the physical link allocation control section controls the number of physical links allocated to each of the storage devices by updating the switch control information for at least one of the plurality of switch devices on the basis of the I/O request performance with respect to each storage device.

19. The computer system according to claim 18, wherein two or more storage devices form a RAID group as a result of grouping in accordance with RAID rules; and the physical link allocation control section controls the number of allocated physical links in RAID group units.

20. The computer system according to claim 1, wherein the computer system is a storage system comprising a plurality of storage devices;

the plurality of SAS target devices are the plurality of storage devices;

the plurality of storage devices are a mix of a SCSI storage device, which is a storage device that performs communications that follow the SCSI protocol, and an ATA storage device, which is a storage device that performs communications that follow the ATA protocol;

the SAS initiator device is a controller that controls I/Os with respect to the respective storage devices;

the plurality of SAS expander devices comprise a plurality of switch devices;

each of the plurality of switch devices comprises a plurality of communication ports connected to a plurality of physical links and a storage area that stores switch control information;

the switch control information records, for each of the plurality of communication ports, direct device data representing devices that are directly attached without the interposition of another communication port and indirect device data representing storage devices that are connected indirectly via another communication port;

when the direct device data for the communication ports is are data representing storage devices, the storage devices are storage devices to which physical links connected to the communication ports are allocated;

the indirect device data for the communication ports is are data representing storage devices to which physical links connected to the communication ports are allocated; and the physical link allocation control section controls the number of physical links allocated to each of the storage devices by updating the switch control information for at least one of the plurality of switch devices on the basis of whether the communication protocol of each storage device is SCSI or ATA.

* * * * *